(12) United States Patent
Whitman et al.

(10) Patent No.: US 11,465,281 B2
(45) Date of Patent: Oct. 11, 2022

(54) DYNAMIC PLANNING CONTROLLER

(71) Applicant: Boston Dynamics, Inc., Waltham, MA (US)

(72) Inventors: Eric Whitman, Waltham, MA (US); Alex Khripin, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 428 days.

(21) Appl. No.: 16/601,035

(22) Filed: Oct. 14, 2019

(65) Prior Publication Data
US 2021/0107150 A1   Apr. 15, 2021

(51) Int. Cl.
*B62D 57/032* (2006.01)
*B25J 9/16* (2006.01)
*G05B 13/04* (2006.01)
*G06N 5/00* (2006.01)

(52) U.S. Cl.
CPC .......... *B25J 9/1653* (2013.01); *G05B 13/042* (2013.01); *G06N 5/003* (2013.01)

(58) Field of Classification Search
CPC ........ B25J 9/1653; B25J 9/162; B25J 9/1697; B25J 9/1628; G05B 13/042; G05B 2219/40298; G05B 2219/40444; G06N 5/003; B62D 57/032
See application file for complete search history.

(56) References Cited

U.S. PATENT DOCUMENTS

| 8,994,312 | B2 * | 3/2015 | Lee | B25J 13/081 |
| | | | | 318/568.1 |
| 9,868,210 | B1 | 1/2018 | Whitman | |
| 2007/0016329 | A1 | 1/2007 | Herr et al. | |
| 2015/0051734 | A1 * | 2/2015 | Zheng | B62D 57/032 |
| | | | | 901/1 |

OTHER PUBLICATIONS

International Search Report and Written Opinion, PCT/US2020/055269, dated Feb. 9, 2021, 16 pages.

* cited by examiner

*Primary Examiner* — Nghia M Doan
(74) *Attorney, Agent, or Firm* — Knobbe, Martens, Olson & Bear, LLP

(57) ABSTRACT

A dynamic planning controller receives a maneuver for a robot and a current state of the robot and transforms the maneuver and the current state of the robot into a nonlinear optimization problem. The nonlinear optimization problem is configured to optimize an unknown force and an unknown position vector. At a first time instance, the controller linearizes the nonlinear optimization problem into a first linear optimization problem and determines a first solution to the first linear optimization problem using quadratic programming. At a second time instance, the controller linearizes the nonlinear optimization problem into a second linear optimization problem based on the first solution at the first time instance and determines a second solution to the second linear optimization problem based on the first solution using the quadratic programming. The controller also generates a joint command to control motion of the robot during the maneuver based on the second solution.

20 Claims, 11 Drawing Sheets

DYNAMIC PLANNING CONTROLLER

TECHNICAL FIELD

This disclosure relates to a dynamic planning controller.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction based mechanisms), or some combination of a manipulator and a mobile robot. Robots are utilized in a variety of industries including, for example, manufacturing, transportation, hazardous environments, exploration, and healthcare. As such, the ability to program robots in a quick and an efficient manner for various behaviors provides additional benefits to such industries.

SUMMARY

One aspect of the disclosure provides a method for a dynamic planning controller. The method includes receiving, at data processing hardware, a maneuver for a legged robot and a current state of the legged robot. The maneuver includes one or more movement events for the legged robot to perform. The method also includes transforming, by the data processing hardware, the maneuver and the current state of the legged robot into a nonlinear optimization problem. The nonlinear optimization problem is configured to optimize an unknown force and an unknown position vector. At a first time instance, the method includes linearizing, by the data processing hardware, the nonlinear optimization problem into a first linear optimization problem and determining, by the data processing hardware, a first solution to the first linear optimization problem using quadratic programming. At a second time instance subsequent to the first time instance, the method includes, by the data processing hardware, linearizing the nonlinear optimization problem into a second linear optimization problem based on the first solution at the first time instance and determining a second solution to the second linear optimization problem based on the first solution using the quadratic programming. The method further includes generating, by the data process hardware, a joint command to control motion of the legged robot during the maneuver based on the second solution.

Implementations of the disclosure may include one or more of the following optional features. In some implementations, the method includes determining, by the data processing hardware, an integrated solution based on the second solution and forward dynamics for the legged robot and determining, by the data processing hardware, that a comparison between the integrated solution and the second solution satisfies an optimization threshold. In this implementation, the optimization threshold indicates a degree of accuracy for a respective solution to generate a joint command. Comparing the integrated solution and the second solution (i.e., the optimized solution) provides a measurement of the accuracy of the linearization. That is, whether the solution to the linearized problem is also a solution of the original non-linear problem.

In some examples, at the second time instance, the method includes, by the data processing hardware, determining that the second solution fails to satisfy a nonlinear constraint and generating an iterative constraint for the second linear optimization problem. In this example, the iterative constraint includes a linear constraint based on the failure of the second solution to satisfy the nonlinear constraint. Here, at the second time instance, the method also includes updating, by the data processing hardware, the second solution to the second linear optimization problem using the quadratic programming, the quadratic programming comprising the iterative constraint.

In some configurations, the unknown force corresponds to a force at a foot of the legged robot when the legged robot performs the maneuver. The unknown position vector may correspond to a location of a body of the legged robot relative to a foot of the legged robot when the legged robot performs the maneuver. Each of the first solution and the second solution may include contact forces for one or more leg of the legged robot against a surface, touchdown positions for the one or more legs of the legged robot, touchdown locations for the one or more legs of the legged robot, touchdown times for the one or more legs of the legged robot, or liftoff times for the one or more legs of the legged robot.

In some implementations, the method includes instructing, by the data processing hardware, joints of at least one stance leg of the legged robot based on the joint command, the joint command comprising joint torques for the joints of the at least one stance leg. Here, the method may include generating, by the data processing hardware, the joint torques for the joints of the at least one stance leg by determining that contact forces of the second solution that correspond to the at least one stance leg satisfy torque limit constraints for at least one stance leg and friction constraints for the at least one stance leg.

In some examples, the legged robot corresponds to a quadruped robot. Receiving the maneuver may include receiving the maneuver from a user device in communication with the data processing hardware and the maneuver may be defined by a user of the user device at a user interface executing on the user device.

Another aspect of the disclosure provides a robot. The robot includes a body, two or more legs coupled to the body, and a control system in communication with the body and the two or more legs. The control system includes data processing hardware and memory hardware in communication with the data processing hardware. The memory hardware stores instructions that when executed on the data processing hardware cause the data processing hardware to perform operations. The operations include receiving a maneuver for the robot and a current state of the robot, the maneuver includes one or more movement events for the robot to perform. The operations also include transforming the maneuver and the current state of the robot into a nonlinear optimization problem. The nonlinear optimization problem is configured to optimize an unknown force and an unknown position vector. At a first time instance, the operations include linearizing the nonlinear optimization problem into a first linear optimization problem and determining a first solution to the first linear optimization problem using quadratic programming. At a second time instance subsequent to the first time instance, the operations include linearizing the nonlinear optimization problem into a second linear optimization problem based on the first solution at the first time instance. At a second time instance subsequent to the first time instance, the operations also include determining a second solution to the second linear optimization problem based on the first solution using the quadratic programming and generating a joint command to control motion of the robot during the maneuver based on the second solution.

This aspect may include one or more of the following optional features. In some configurations, the operations include determining an integrated solution based on the second solution and forward dynamics for the robot and determining that a comparison between the integrated solution and the second solution satisfies an optimization threshold. In this configuration, the optimization threshold indicates a degree of accuracy for a respective solution to generate a joint command.

In some implementations, at the second time instance, the operations include determining that the second solution fails to satisfy a nonlinear constraint and generating an iterative constraint for the second linear optimization problem. Here, the iterative constraint includes a linear constraint based on the failure of the second solution to satisfy the nonlinear constraint. In this implementations, at the second time instance, the operations also include updating the second solution to the second linear optimization problem using the quadratic programming, the quadratic programming comprising the iterative constraint.

In some examples, the unknown force corresponds to a force at a foot of the robot when the robot performs the maneuver. The unknown position vector may correspond to a location of the body of the robot relative to a foot of the robot when the robot performs the maneuver. Each of the first solution and the second solution may include contact forces for one or more leg of the legged robot against a surface, touchdown positions for the one or more legs of the legged robot, touchdown locations for the one or more legs of the legged robot, touchdown times for the one or more legs of the legged robot, or liftoff times for the one or more legs of the legged robot.

In some configurations, the operations include instructing joints of at least one stance leg of the two or more legs of the robot based on the joint command, the joint command including joint torques for the joints of the at least one stance leg. Here, the operations may include generating the joint torques for the joints of the at least one stance leg by determining that contact forces of the second solution that correspond to the at least one stance leg satisfy torque limit constraints for at least one stance leg and friction constraints for the at least one stance leg.

In some implementations, the robot corresponds to a quadruped robot. The robot, when receiving the maneuver, may include receiving the maneuver from a user device in communication with the data processing hardware and the maneuver may be defined by a user of the user device at a user interface executing on the user device.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
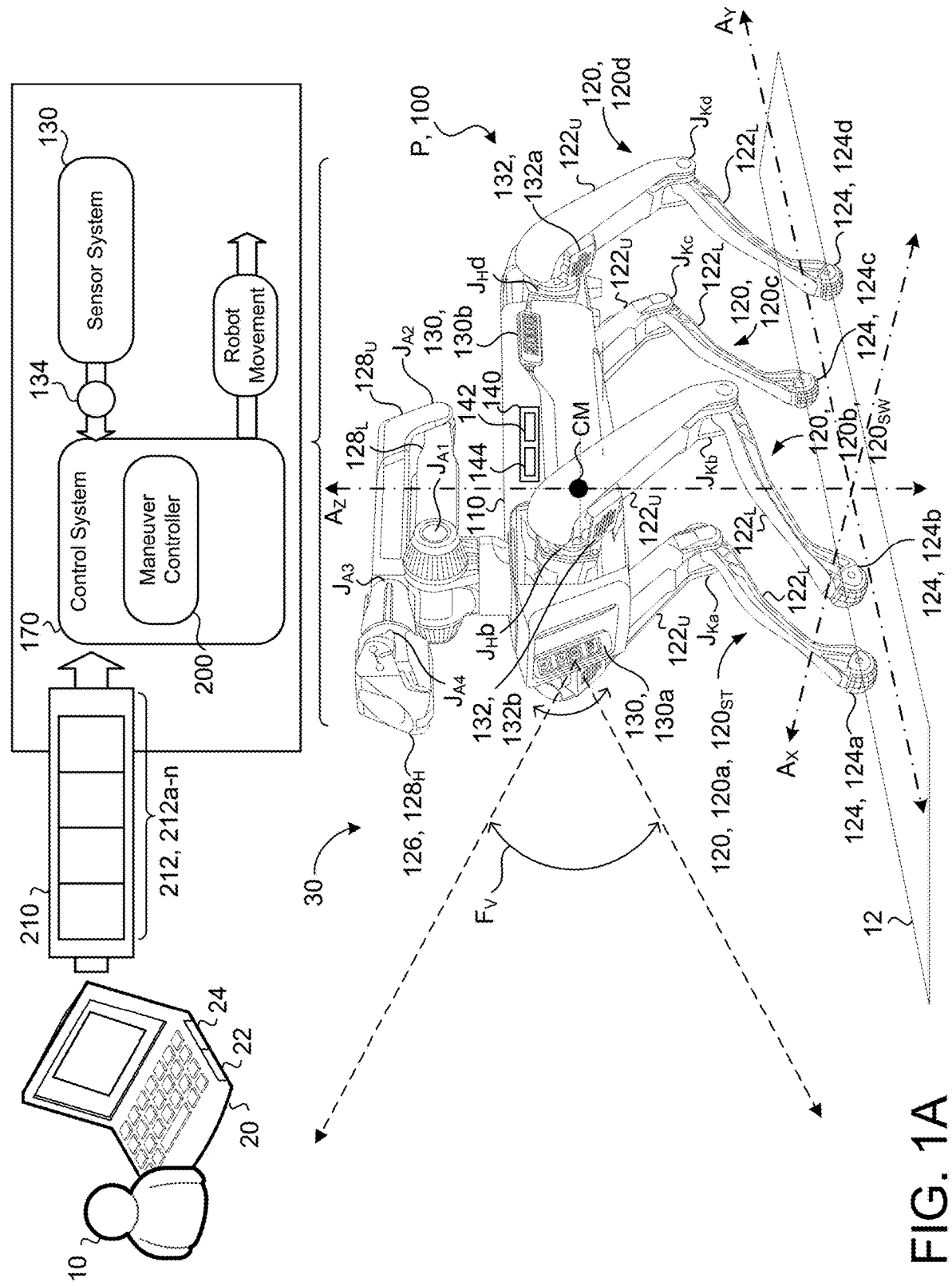
FIG. 1A is a perspective view of an example robot in a robotic environment.

An entity that owns or controls a robot may want to preprogram movement for the robot, such as a repeatable movement routine. Unfortunately, preprogrammed movements may require hardcoding to generate the desired movements. Hardcoding is generally time consuming and may lead to bottlenecks such that only a limited number of people (e.g., coders) may be able to code movements for the robot. Moreover, modifications to coded movements or the debugging of coded movements may lead to lengthy feedback loops to implement a movement routine. Stated differently, robots often lack a means to rapidly author robot behavior.

Another potential issue with preprogrammed movement is that it may or may not account for the environment about the robot and/or the physics of the robot itself. In other words, someone coding the preprogrammed movements may not realize that there may be other constraints on the robot during the preprogrammed movements. Without accounting for these other constraints, a preprogrammed routine may fail or damage the robot or the environment about the robot during execution. For instance, the coder for the preprogrammed movement routine may not realize that the robot will be carrying an additional twenty-five pound load during the routine or that the routine may occur in a dynamic environment with static or dynamic obstacles. This clearly puts the onus on the entity or the coder to account for all or a majority of conditions that the robot will experience during a movement routine in order to achieve a successful movement routine.

To overcome some of these issues, the robot 100 includes a maneuver controller 200 that is capable of building movements for the robot 100 without significant hardcoding. In other words, the maneuver controller 200 is a controller that provides a flexible framework for generating dynamic robot behavior with minimal user input. With this flexible framework, the maneuver controller 200 functions as a type of rapid prototyping pipeline that allows a user (e.g., a robot operator or robot owner) to generate new robot behaviors (e.g., movement routines or movement patterns) at a reduced cost of programming and/or engineering labor. Here, the maneuver controller 200 receives user-readable/writable inputs and transforms those inputs into motion commands.

In some examples, the user 10 generates a maneuver 210 for the maneuver controller 200 on a user device 20. Here, the user device 20 executes an interface that allows the user 10 to define the maneuver 210 using computing resources 22, 24 such as data processing hardware 22 and memory hardware 24 in communication with the data processing hardware 22. Some examples for the user device 20 include a mobile device (e.g., a mobile phone, a tablet, a laptop, etc.), a personal computer (PC), a workstation, a terminal, or any other computing device with computing capabilities to generate a maneuver 210. The interface accessible at the user device 20 may be web-based (e.g., a web-based application launched from a web browser), local to the user device 20 (e.g., installed on and/or configured to execute on the computing resources 22, 24 of the user device 20), or some combination of both. In some implementations, the user device 20 uses the interface to communicate the maneuver 210 to the robot 100 using a wired or a wireless connection. For instance, the interface communicates the maneuver 210 to the robot 100 over a network (e.g., the network 150 shown in FIG. 1B).

Referring to FIG. 1A, the robot 100 includes a body 110 with locomotion based structures such as legs 120a-d coupled to the body 110 that enable the robot 100 to move about the environment 30. In some examples, each leg 120 is an articulable structure such that one or more joints J permit members 122 of the leg 120 to move. For instance, each leg 120 includes a hip joint $J_H$ coupling an upper member 122, $122_U$ of the leg 120 to the body 110 and a knee joint $J_K$ coupling the upper member $122_U$ of the leg 120 to a lower member $122_L$ of the leg 120. Although FIG. 1A depicts a quadruped robot with four legs 120a-d, the robot 100 may include any number of legs or locomotive based structures (e.g., a biped or humanoid robot with two legs) that provide a means to traverse the terrain within the environment 30.

In order to traverse the terrain, each leg 120 has a distal end 124 that contacts a surface of the terrain (i.e., a traction surface). In other words, the distal end 124 of the leg 120 is the end of the leg 120 used by the robot 100 to pivot, plant, or generally provide traction during movement of the robot 100. For example, the distal end 124 of a leg 120 corresponds to a foot of the robot 100. In some examples, though not shown, the distal end 124 of the leg 120 includes an ankle joint JA such that the distal end 124 is articulable with respect to the lower member $122_L$ of the leg 120.

In some examples, the robot 100 includes an arm 126 that functions a robotic manipulator. The arm 126 may be configured to move about multiple degrees of freedom in order to engage elements of the environment 30 (e.g., objects within the environment 30). In some examples, the arm 126 includes one or more members 128 where the members 128 are coupled by joints J such that the arm 126 may pivot or rotate about the joint(s) J. For instance, with more than one member 128, the arm 126 may be configured to extend or to retract. To illustrate an example, FIG. 1A depicts the arm 126 with three members 128 corresponding to a lower member 128L, an upper member $128_U$, and a hand member $128_H$. Here, the lower member 128L may rotate or pivot about a first arm joint $J_{A1}$ located adjacent to the body 110 (e.g., where the arm 126 connects to the body 110 of the robot 100). The lower member 128L is coupled to the upper member $128_U$ at a second arm joint $J_{A2}$ and the upper member $128_U$ is coupled to the hand member $128_H$ at a third arm joint $J_{A3}$. In some examples, the hand member $128_H$ includes additional members to enable different types of grasping. These additional members may range from a simple two member claw-like hand member $128_H$ to a more complicated hand member $128_H$ that simulates the digits of a human hand. In some implementations, the arm 126 connects to the robot 100 at a socket on the body 110 of the robot 100. In some configurations, the socket is configured as a connector such that the arm 126 may attach or detach from the robot 100 depending on whether the arm 126 is needed for operation.

The robot 100 has a vertical gravitational axis (e.g., shown as a Z-direction axis $A_Z$) along a direction of gravity, and a center of mass CM, which is a position that corresponds to an average position of all parts of the robot 100 where the parts are weighted according to their masses (i.e., a point where the weighted relative position of the distributed mass of the robot 100 sums to zero). The robot 100 further has a pose P based on the CM relative to the vertical gravitational axis $A_Z$ (i.e., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 alters the pose P of the robot 100 (i.e., the combination of the position of the CM of the robot and the attitude or orientation of the robot 100). Here, a height generally refers to a distance along the z-direction. The sagittal plane of the robot 100 corresponds to the Y-Z plane extending in directions of a y-direction axis $A_Y$ and the z-direction axis $A_Z$. In other words, the sagittal plane bisects the robot 100 into a left and a right side. Generally perpendicular to the sagittal plane, a ground plane (also referred to as a transverse plane) spans the X-Y plane by extending in directions of the x-direction axis $A_X$ and the y-direction axis $A_Y$. The ground plane refers to a ground surface 12 where distal ends 124 of the legs 120 of the robot 100 may generate traction to help the robot 100 move about the environment 30. Another anatomical plane of the robot 100 is the frontal plane that extends across the body 110 of the robot 100 (e.g., from a left side of the robot 100 with a first leg 120a to a right side of the robot 100 with a second leg 120b). The frontal plane spans the X-Z plane by extending in directions of the x-direction axis $A_X$ and the z-direction axis $A_Z$.

When a legged-robot moves about the environment 30, each leg 120 of the robot 100 may either be in contact with the ground surface 12 or not in contact with the ground surface 12. When a leg 120 is in contact with the ground surface 12, the leg 120 is referred to as a stance leg $120_{ST}$. When a leg 120 is not in contact with the ground surface 12, the leg 120 is referred to as a swing leg $120_{SW}$. A leg 120 transitions from a stance leg $120_{ST}$ to a swing leg $120_{SW}$ when the leg 120 lifts-off (LO) from the ground surface 12. Accordingly, a swing leg $120_{SW}$ may also transition to a stance leg $120_{ST}$ when the swing leg touches down (TD) against the ground surface 12 after not being in contact with the ground surface 12. Here, while a leg 120 is functioning as a swing leg $120_{SW}$, another leg 120 of the robot 100 may be functioning as a stance leg $120_{ST}$ (e.g., to maintain balance for the robot 100).

In order to maneuver about the environment 30, the robot 100 includes a sensor system 130 with one or more sensors 132, 132a-n (e.g., shown as a first sensor 132, 132a and a second sensor 132, 132b). The sensors 132 may include vision/image sensors, inertial sensors (e.g., an inertial measurement unit (IMU)), force sensors, and/or kinematic sensors. Some examples of sensors 132 include a camera such as a stereo camera, a scanning light-detection and ranging (LIDAR) sensor, or a scanning laser-detection and ranging (LADAR) sensor. In some examples, the sensor 132 has a corresponding field(s) of view $F_V$ defining a sensing range or region corresponding to the sensor 132. For instance, FIG. 1A depicts a field of a view $F_V$ for the robot 100. Each sensor 132 may be pivotable and/or rotatable such that the sensor 132 may, for example, change the field of view $F_V$ about one or more axis (e.g., an x-axis, a y-axis, or a z-axis in relation to a ground plane).

When surveying a field of view $F_V$ with a sensor 132, the sensor system 130 generates sensor data 134 (also referred to as image data) corresponding to the field of view $F_V$. In some examples, the sensor data 134 is image data that corresponds to a three-dimensional volumetric point cloud generated by a three-dimensional volumetric image sensor 132. Additionally or alternatively, when the robot 100 is maneuvering about the environment 30, the sensor system 130 gathers pose data for the robot 100 that includes inertial measurement data (e.g., measured by an IMU). In some examples, the pose data includes kinematic data and/or orientation data about the robot 100, for instance, kinematic data and/or orientation data about joints J or other portions of a leg 120 of the robot 100. With the sensor data 134, various systems of the robot 100 may use the sensor data 134 to define a current state of the robot 100 (e.g., of the kinematics of the robot 100) and/or a current state of the environment 30 about the robot 100.

In some implementations, the sensor system 130 includes sensor(s) 132 coupled to a joint J. In some examples, these sensors 132 couple to a motor M that operates a joint J of the robot 100 (e.g., sensors 132, 132a-b). Here, these sensors 132 generate joint dynamics in the form of joint-based sensor data 134. Joint dynamics collected as joint-based sensor data 134 may include joint angles (e.g., an upper member $122_U$ relative to a lower member $122_L$), joint speed (e.g., joint angular velocity or joint angular acceleration), and/or forces experienced at a joint J (also referred to as joint forces). Here, joint-based sensor data 134 generated by one or more sensors 132 may be raw sensor data, data that is further processed to form different types of joint dynamics $134_{JD}$, or some combination of both. For instance, a sensor 132 measures joint position (or a position of member(s) 122 coupled at a joint J) and systems of the robot 100 perform further processing to derive velocity and/or acceleration from the positional data. In other examples, a sensor 132 is configured to measure velocity and/or acceleration directly.

As the sensor system 130 gathers sensor data 134, a computing system 140 is configured to store, to process, and/or to communicate the sensor data 134 to various systems of the robot 100 (e.g., the control system 170 and/or the maneuver system 300). In order to perform computing tasks related to the sensor data 134, the computing system 140 of the robot 100 includes data processing hardware 142 and memory hardware 144. The data processing hardware 142 is configured to execute instructions stored in the memory hardware 144 to perform computing tasks related to activities (e.g., movement and/or movement based activities) for the robot 100. Generally speaking, the computing system 140 refers to one or more locations of data processing hardware 142 and/or memory hardware 144.

In some examples, the computing system 140 is a local system located on the robot 100. When located on the robot 100, the computing system 140 may be centralized (i.e., in a single location/area on the robot 100, for example, the body 110 of the robot 100), decentralized (i.e., located at various locations about the robot 100), or a hybrid combination of both (e.g., where a majority of centralized hardware and a minority of decentralized hardware). To illustrate some differences, a decentralized computing system 140 may allow processing to occur at an activity location (e.g., at motor that moves a joint of a leg 120) while a centralized computing system 140 may allow for a central processing hub that communicates to systems located at various positions on the robot 100 (e.g., communicate to the motor that moves the joint of the leg 120).

Additionally or alternatively, the computing system 140 includes computing resources that are located remotely from the robot 100. For instance, the computing system 140 communicates via a network 150 with a remote system 160 (e.g., a remote server or a cloud-based environment). Much like the computing system 140, the remote system 160 includes remote computing resources such as remote data processing hardware 162 and remote memory hardware 164. Here, sensor data 134 or other processed data (e.g., data processing locally by the computing system 140) may be stored in the remote system 160 and may be accessible to the computing system 140. In some examples, the computing system 140 is configured to utilize the remote resources 162, 164 as extensions of the computing resources 142, 144 such that resources of the computing system 140 may reside on resources of the remote system 160.

Figure 1B:
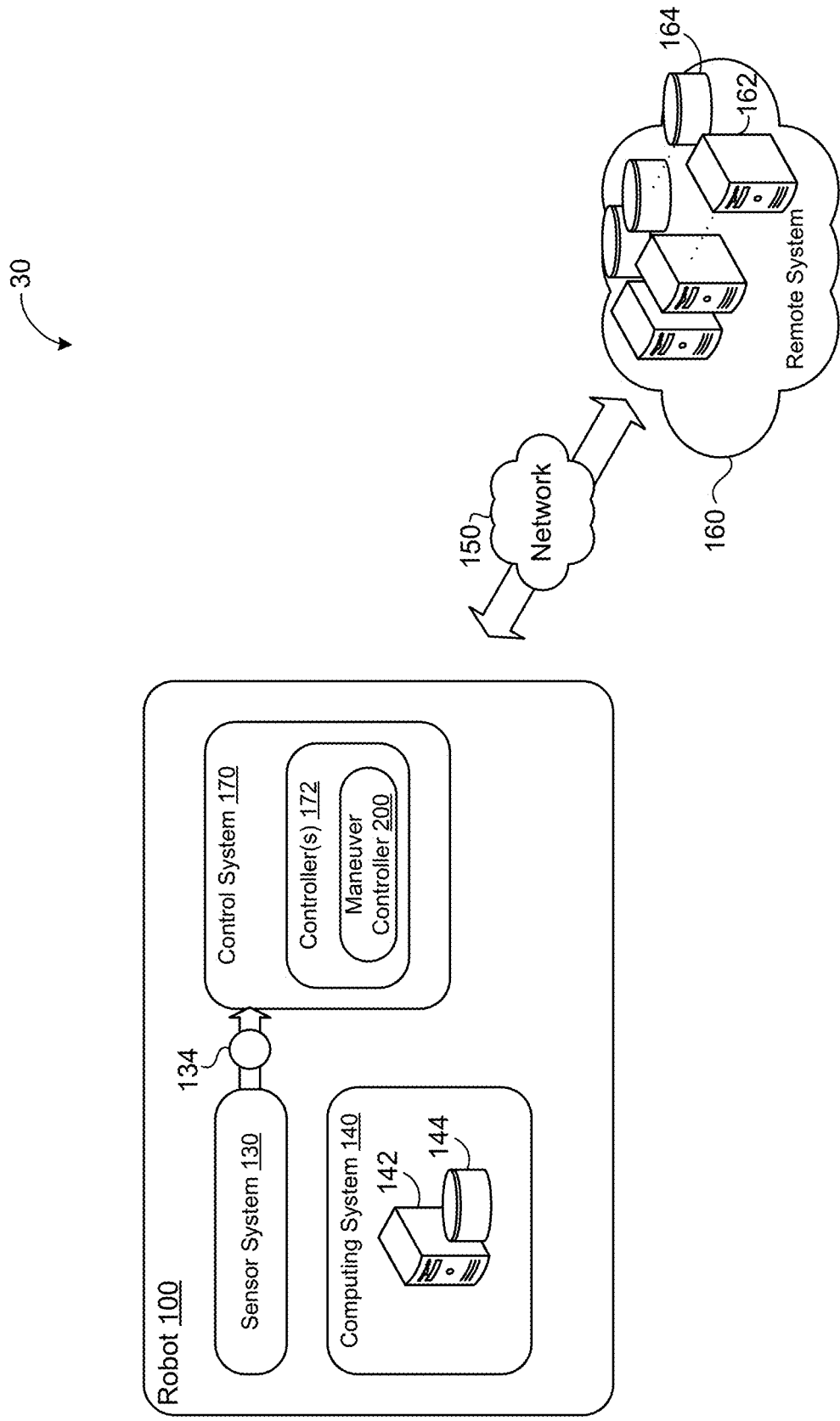
FIG. 1B is a schematic view of example system of the robot of FIG. 1A.

In some implementations, as shown in FIGS. 1A and 1B, the robot 100 includes a control system 170. The control system 170 may be configured to communicate with systems of the robot 100 such as the at least one sensor system 130. The control system 170 may perform operations and other functions using hardware 140. The control system 170 includes at least one controller 172 that is configured to control the robot 100. For example, the controller 172 controls movement of the robot 100 to traverse about the environment 30 based on input or feedback from the systems of the robot 100 (e.g., the sensor system 130 and/or the control system 170). In some implementations, the controller 172 controls movement between poses and/or behaviors of the robot 100.

In some examples, a controller 172 controls the robot 100 by controlling movement about one or more joints J of the robot 100. In some configurations, a controller 172 is software with programming logic that controls at least one joint J or a motor M which operates, or is coupled to, a joint J. For instance, the controller 172 controls an amount of force that is applied to a joint J (e.g., torque at a joint J). As programmable controllers 172, the number of joints J that a controller 172 controls is scalable and/or customizable for a particular control purpose. A controller 172 may control a single joint J (e.g., control a torque at a single joint J) or control multiple joints J of the robot 100. When controlling multiple joints J, the controller 172 may apply the same or different torques to each joint J controlled by the controller 172. By controlling multiple joints J, a controller 172 may coordinate movement for a larger structure of the robot 100 (e.g., the body 110, one or more legs 120, the arm 126). In other words, for some maneuvers 210, a controller 172 may be configured to control movement of multiple parts of the robot 100 such as, for example, two legs 120a-b, four legs 120a-d, or two legs 120a-b combined with the arm 126.

In some implementations, the one or more controllers 172 of the control system 170 include a maneuver controller 200. The maneuver controller 200 may function like other controllers 172 of the control system 170, but is additionally capable of providing control for inputs referred to as maneuvers 210. In other words, the maneuver controller 200 is a controller 172 capable of dynamically planning a maneuver 210. A maneuver 210 is a control specification that sparsely defines one or more movement events 212. In some examples, the maneuver 210 is user-facing such that a user 10 writes the control specification defining the maneuver 210 (e.g., with some basic coding). Although the control specification may include some degree of coding, the maneuver 210 is generally designed to have a minimal specification. By having a minimal specification, the user 10 may be able to quickly and/or to efficiently generate new behaviors for the robot 100 and/or modify old behaviors. As part of the specification, the user 10 describes the behavior that the user 10 wants the robot 100 to perform based on one or more movement events 212, 212a-n. For example, with a legged robot 100, often maneuvers 210 predominantly affect leg motion. Here, some movement events 212 for a legged robot 100 include touchdown of a foot 124 and/or liftoff of a foot 124. In some examples, the movement events 212 describe chronologically what the user 10 wants the robot 100 to do in the behavior. In other words, a movement event 212 includes a movement (or lack thereof) and time duration for the movement. In this respect, movement events 212 may include movement pauses where the robot 100 is not performing any movement. For example, if the user 10 wants the robot 100 to perform a handstand as the maneuver 210, the movement events 212 of the handstand maneuver 210 may describe touchdown for the two front legs 120 of the robot 100 followed by liftoff for the two rear legs 120 of the robot 100 and ending with a pause/wait period of some specified duration (e.g., to hold the handstand position). When the maneuver controller 200 interprets the maneuver 210, the maneuver controller 200 is configured to analyze the maneuver 210 chronologically from a beginning of the maneuver 210 to the end of the maneuver 210 such that the maneuver 210 itself does not dynamically change during execution.

In some implementations, the maneuver 210 is stateless. In other words, the maneuver 210 is only concerned about what a user 10 wants the robot 100 to do for a behavior and not about what the robot 100 is currently doing. This stateless approach may also simplify maneuver generation by the user 10 because the user 10 does not have to worry about potentially more complicated current dynamics of the robot 100 and/or dynamics of the environment 30 about the robot 100.

In some examples, the maneuver controller 200 receives more than one maneuvers 210. For instance, the user 10 generates more than one maneuver 210 and requests that the robot 100 perform two or more maneuvers 210 at the same time. In some implementations, the robot 100 communicates with an interface that includes preprogrammed or a hard-coded list of maneuvers 210 that the user 10 may select the robot 100 to perform. Here, although the interface includes a finite number of maneuvers 210, the interface may allow the user 10 to combine maneuvers 210 in various ways for greater customization. This type of controlled customization may be preferable for users 10 with little or no coding capabilities or when a robot owner wants to control the types of maneuvers 210 that the robot 100 receives.

Some maneuvers 210 may passively control portions of the robot 100 (e.g., joints J of the robot 100) while other maneuvers 210 actively control portions of the robot 100 (e.g., joints J of the robot 100). State differently, a passive maneuver 210 refers to a behavior that modifies a primary behavior. With respect to joint control, two maneuvers 210 may impact similar joints J. For example, practically speaking, movement of the body 110 occurs by making a change to at least one joint J of at least one leg 120 of the robot 100. Yet, when the joints J of the leg 120 are already allocated to a maneuver 210 (e.g., for footstep maneuvers 210 or leg maneuvers), a movement of the body 110 may cause joint control interference. In other words, a body maneuver 210 is a secondary consideration that may impact joint control when it would not interfere with, for example, a leg maneuver 210. In some examples, to prevent issues caused by joint interference, certain maneuvers 210 are designated during creation as passive maneuvers 210 or primary maneuvers 210. In some implementations, the maneuver controller 200 determines whether a maneuver 210 is a passive maneuver 210 and suggests a behavior modification to a primary behavior or a maneuver 210 associated with a primary behavior when the maneuver 210 is a passive maneuver 210. Here, a maneuver 210 that may modify a behavior is referred to as a hint. When a hint occurs at a particular time instance, each other active controller 172 (e.g., the maneuver controller 200) considers the hint. When a controller 172 interprets the hint, the controller 172 may determine that the hint corresponds to joints J different from joints J that the controller 172 controls and ignore modifying its controller behavior for the hint. When the hint corresponds to the same joints J, the controller 172 may incorporate the behavior modification of the hint into its own behavior.

Referring to FIGS. 2A-2G, the maneuver controller 200 includes a problem generator 220 and a solver 230. The problem generator 220 is configured to translate a maneuver 210 that the maneuver controller 200 receives into a format that enables the maneuver system 200 to perform movement controls that execute or attempt to execute the maneuver 210. In some examples, in order to execute the one or more maneuvers 210, the maneuver system 200 accounts for a current state 202 of the robot 100. More specifically, executing the maneuver 210 in a vacuum without accounting for the current state 202 of the robot 100 may significantly reduce the ability of the robot 100 to successfully execute the maneuver 210. Since the maneuver 210 is stateless, the problem generator 220 forms a problem 222 for the solver 230 by combining a maneuver 210 with a current state 202 of the robot 100. Here, the problem 222 formed by the problem generator 220 is solver-facing. As solver-facing, in some examples, the problem 222 does not have to be a human-readable format and can instead be a machine-readable format. Furthermore, since the problem 222 includes the current state 202 of the robot 100, the problem 222 is stateful.

In some implementations, the problem generator 220 generates a problem 222 that includes divisions of time. These divisions of time are referred to as time steps 224. In comparing the maneuver 210 to the problem 222, the maneuver 210 operates in movement events 212 that generally say when movement changes while the problem 222 describes what to do during the time steps 224. In some configurations, the time steps 224 are a fixed size (e.g., fifty milliseconds). The size of the time steps 224 may correspond to the timing between movement events 212 of the maneuver 210. For instance, the problem generator 220 determines a size of the time steps 224 by determining the time between each specified movement event 212. Once the problem generator 220 determines the time between each adjacent movement event 212, the lowest amount of time between movement events 212 may become the fixed size of the time step 224 or correspond to a multiple of the fixed size for the time step 224. Generally speaking, the problem generator 220 divides the maneuver 210 such that movement events 212 occur at a boundary 224b of a time step 224.

When dividing a maneuver 210 into time steps 224, the problem generator 220 may be configured to recognize that too many time steps 224 are computationally expensive. Due to these expenses, in some examples, the problem generator 220 combines time steps 224. In one approach to combine time steps 224, the problem generator 220 generates time steps 224 such that the time steps 224 increase in size the further into the future for the maneuver 210. In other words, time steps 224 get longer in duration the further into the future. In some implementations, even as the time steps 224 get longer, the longer time steps 224 are integer multiples of the initial time step 224 (i.e., the shortest basic time step unit). This approach allows a maneuver 210 to have fine grain time instruction with the shortest basic time step unit in the immediate future and increasingly coarser grain time instruction the further into the future of maneuver(s) 210. In some configurations, the problem generator 220 communicates a maximum number of time steps 224 to the solver 230. Here, the maximum number of time steps 224 may be predetermined (e.g., in order to maintain computational speeds of the solver 230). Although, the problem generator 220 may generate more than the maximum number of time steps 224 and the solver 230 will still function, the maximum number allows the solver 230 to, for example, maintain computational efficiency and timely throughput.

Figure 2A:
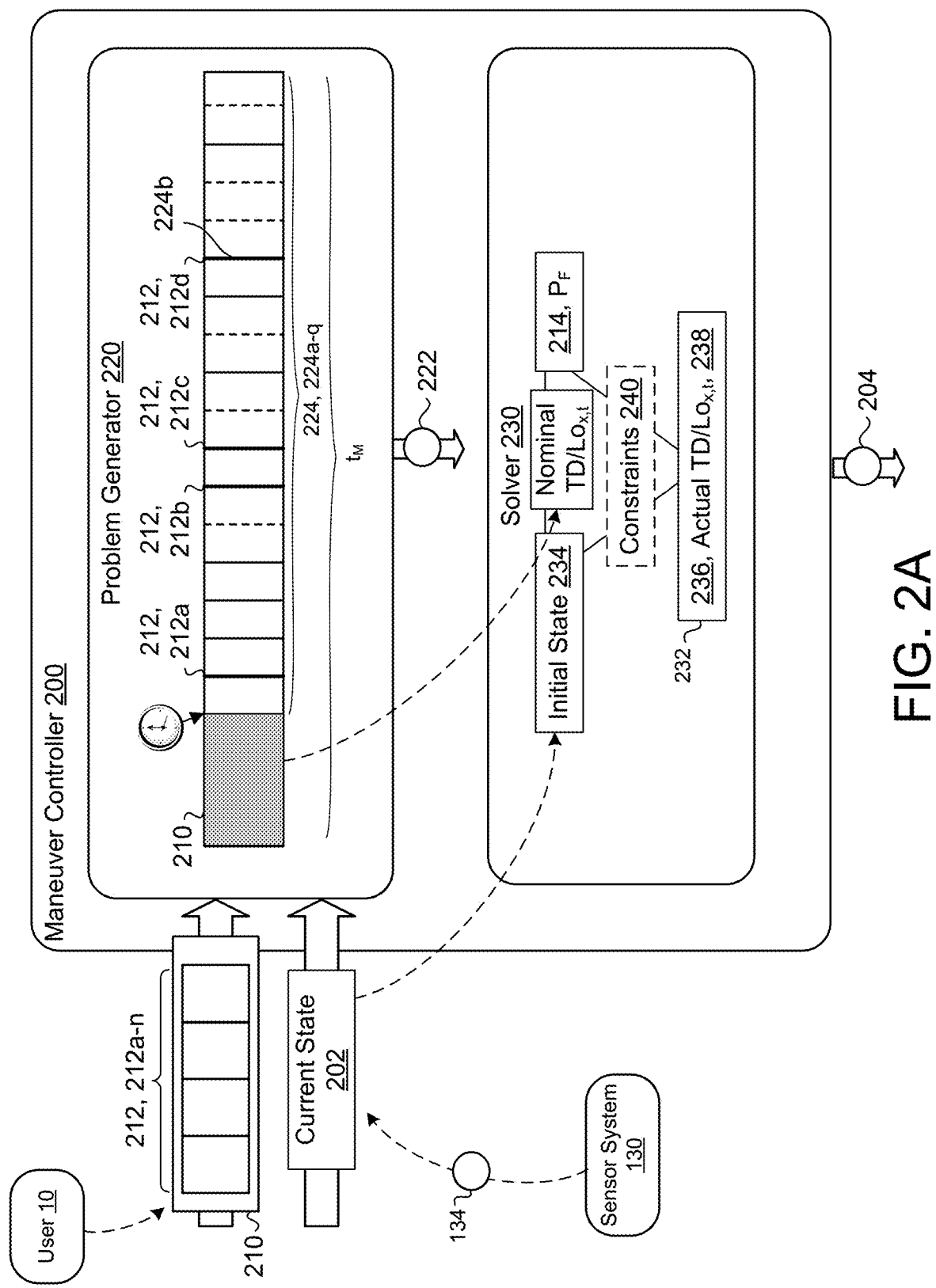
FIGS. 2A-2G are schematics view of example maneuver controllers for the robot of FIG. 1A.

To illustrate, FIG. 2A depicts a maneuver 210 divided into time steps 224. Here, the maneuver 210 also includes four events 212, 212a-d where a first event 212, 212a is a liftoff of a first leg 120, 120a, a second event 212, 212b is a touchdown of the first leg 120, 120a, a third event 212, 212c is a liftoff of a second leg 120, 120b, and a fourth event 212, 212d is a touchdown of the second leg 120, 120b. In this example, close to the current time (as shown by the clock), the time steps 224 are a single time step unit in length for four time steps 224, 224a-d, and then the next two time steps 224, 224e-f are combined into a single time step 224 (e.g., as shown by the dotted line). After the combined two time steps 224e-f, there is another single time step 224, 224g followed by two more combined sets of two time steps, a first set of time steps 224, 224h-i and second set of time steps 224, 224j-k. After the second set of time steps 224j-k, there is another single time step 224, 224l followed by a set of three time steps 224, 224m-o. Subsequent to the set of three time steps 224m-o, the maneuver 210 ends with a set of two time steps 224, 224p-q. In this example, the combination of time steps 224 generally follows a pattern that there are four sets of a basic time step length followed by four sets of twice the basic time step length followed by four sets of three times the basic time step length. Here, this patterns is slightly disrupted up by movement events 212. Even though time steps 224 may be combined, the problem generator 220 maintains that there are time step boundaries at movement events 212. In other words, as shown in FIG. 2A, the single time step 224g would generally be part of a larger time step 224 except that the second movement event 212b and the third movement event 212c form boundaries 224b to the single time step 224g. In this scenario, if the single time step 224g was combined into a larger time step 224, one or both movement events 212b-c of the maneuver 210 may lack important time detail (e.g., that may be critical to the success of the maneuver 210).

Figure 2B:
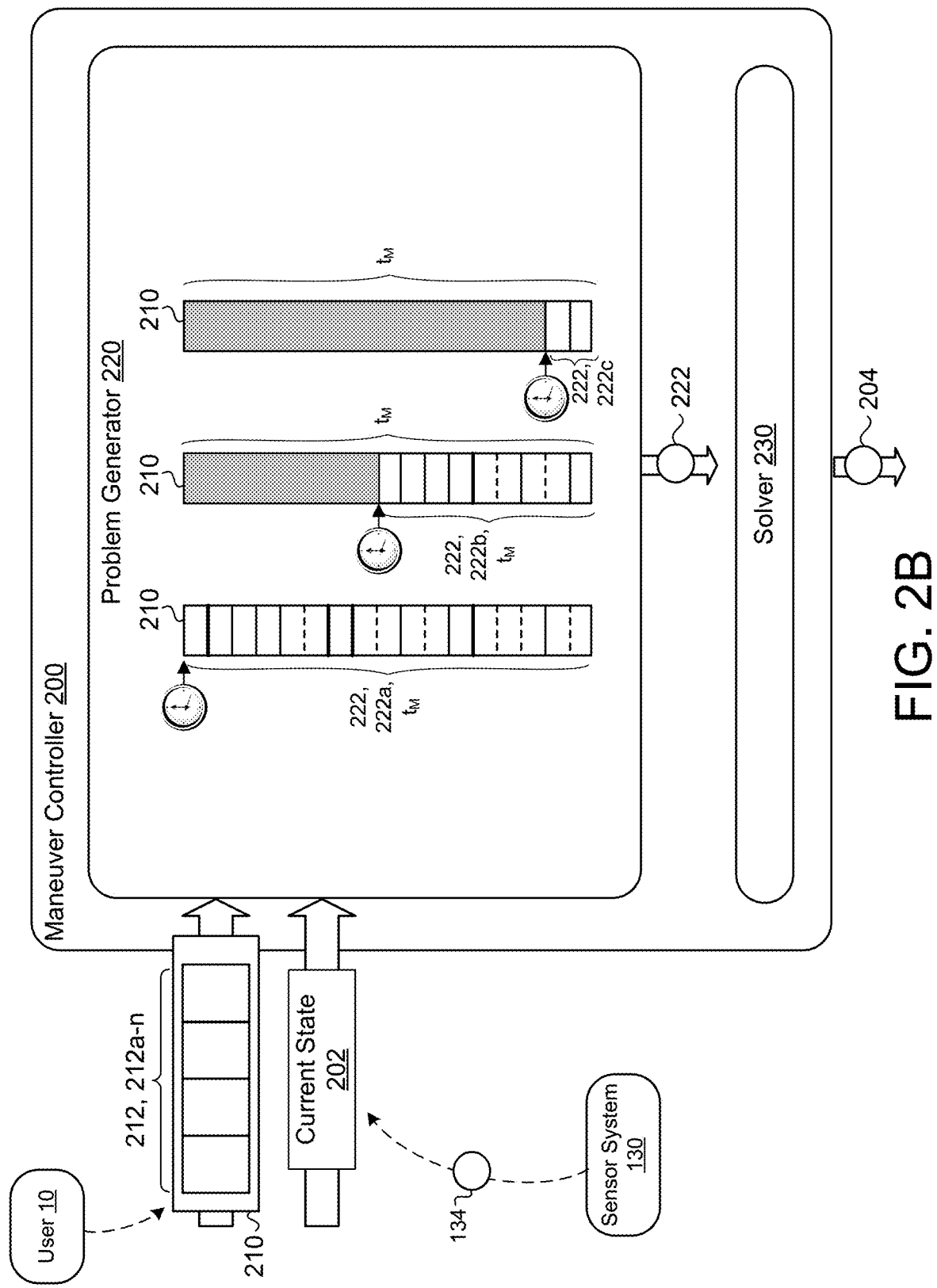

In some examples, unlike the maneuver 210, the problem 222 changes throughout the maneuver(s) 210. For instance, the problem 222 changes every time step 224. FIG. 2B is an example that depicts the problem generator 220 generating new problems 222 during the maneuver 210. Here, the problem generator 220 generates a first problem 222, 222a for the entire maneuver 210. Then, halfway through the maneuver 210, the problem generator 220 generates a second problem 222, 222b for the second half of the maneuver 210. When the solver 230 is a majority of the way through the maneuver 210 (e.g., 90% through the maneuver 210), the problem generator 220 generates a third problem 222, 222c for the remaining portion of the maneuver 210 (e.g., the remaining 10%). By adapting the problem 222 to every change in time step 224, the problem generator 220 ensures that the solver 230 addresses the most current problem 222.

Figure 2C:
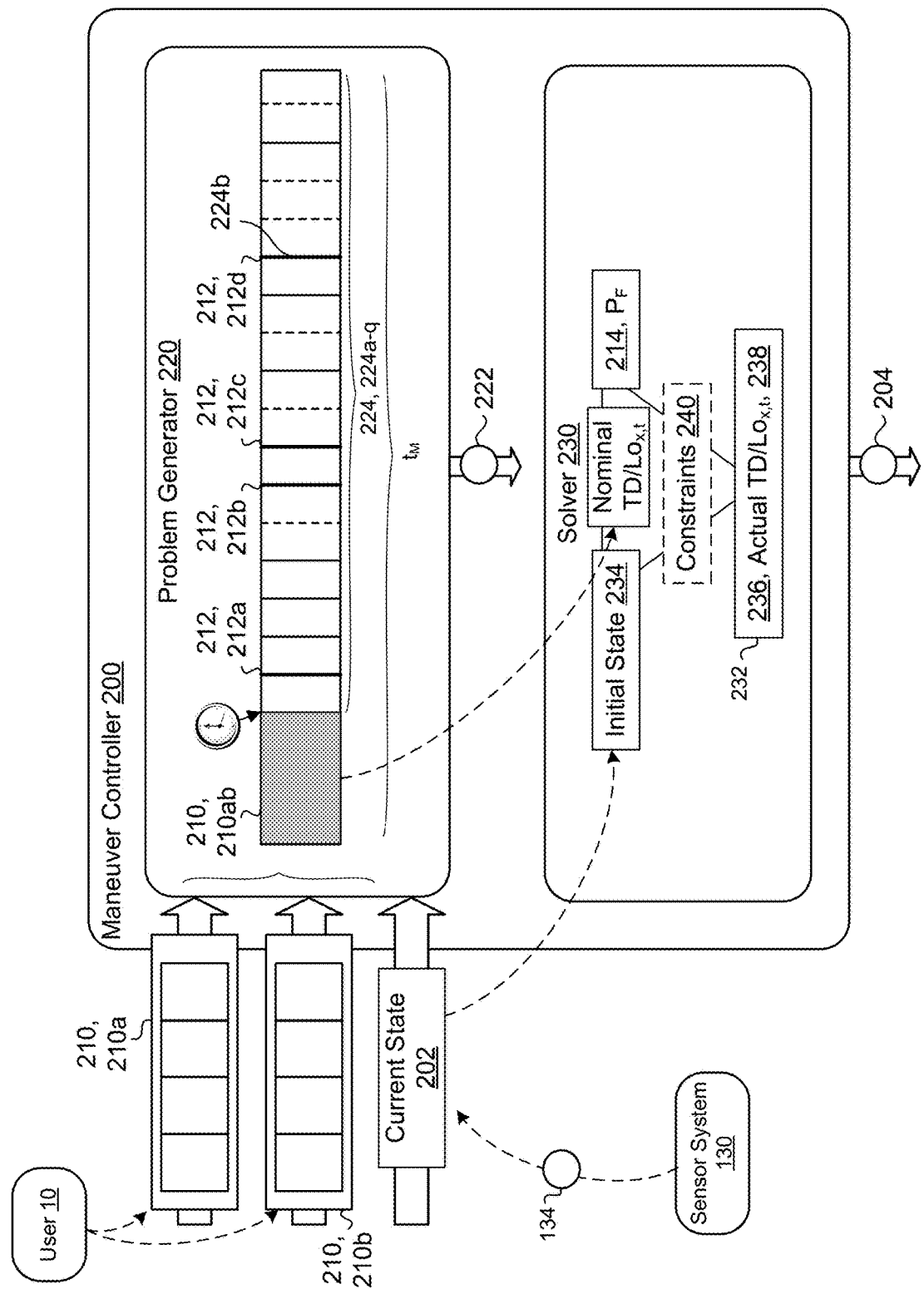

In some implementations, such as FIG. 2C, the problem generator 220 is configured to determine whether to modify maneuver(s) 210 based on hints received at the maneuver controller 200. For instance, when the maneuver controller 200 receives a hint as a first maneuver 210, 210a and a non-hint second maneuver 210, 210b, the problem generator 220 determines whether the hint 210a corresponds to joints J different from joints J that the maneuver controller 200 controls. When the hint 210a corresponds to joints J different from joints J that the maneuver controller 200 controls, the maneuver controller 200 ignores modifying the movement behavior of the non-hint second maneuver 210, 210b (not shown). Yet, when the hint corresponds to the same joints J, the problem generator 220 may incorporate the behavior modification of the hint 210a into the behavior of the second maneuver 210b (e.g., shown as a modified maneuver 210ab). In some examples, the problem generator 220 identifies the joints J of a maneuver 210 based on the specification of each maneuver 210. Here, the specification may identify which joints J are delegated to the maneuver 210.

In some examples, the problem generator 220 helps to resolve inconsistencies between the current state 202 of the robot 100 and the intended state of the robot 100. State differently, the current state 202 of the robot 100 may vary from the intended state of the robot 100 such that this variance may cause issues for the solver 230 to accurately identify behavior controls for the maneuver controller 200. For example, according to the maneuver 210 and the clock of the robot 100, the robot 100 should have two legs 120, 120a-b on the ground surface 12 although the measured state (i.e., the current state 202) reflects that the robot 100 still has a first leg 120, 120a in the air (e.g., as a swing leg $120_{SW}$) that has not touched down yet (i.e., a late touchdown). Here, the problem generator 220 by incorporating the current state 202 of the robot 100 ensures that the solver 230 does not falsely determine a solution 232 that does not consider the late touchdown that the current state 202 identifies. Similar to a late touchdown, the problem generator 220 also may identify (e.g., by the current state 202) that a leg 120 has an early touchdown.

With continued reference to FIGS. 2A-2F, the solver 230 receives the problem 222 from the problem generator 220 and outputs a solution 232 to the problem 222. In some examples, the solver 230 identifies an initial state 234 of the robot 100 based on the current state 202 incorporated into the problem 222. For instance, when the maneuver controller 200 is predominantly handling movements for a legged robot 100, the initial state 234 includes which feet 124 are currently in contact with the ground surface 12 and where these feet 124 are in contact with the ground surface. The initial state 234 may also include initial dynamics of the body 110 of the robot 100 such as a position of the body 110, velocity of the body 110, and/or an orientation of the body 110. In some examples, from the maneuver 210 incorporated into the problem 222, the problem 222 includes nominal liftoff and/or touchdown times as well as nominal liftoff and/or touchdown locations (e.g., shown as $TD/Lo_{x,z}$). Here, the term nominal designates that the liftoff/touchdown times and liftoff/touchdown locations are targets specified by the maneuver 210 (e.g., from the user 10 who authored the maneuver 210). In these examples, the maneuver 210 may also specify a contact normal that defines a direction of the contact surface (e.g., ground surface 12). Here, with the contact normal, the robot 100 (e.g., at the solver 230) may be able to determine a friction cone that identifies how different forces may be applied to the contact surface without slipping or having a threshold risk of slipping. The solver 230 also receives, as part of the problem 222, a cost function 214 (e.g., specified at by the maneuver 210). The cost functions 214 refers to an identification of a final pose $P_F$ for the maneuver 210 and/or an value designating the importance of this final pose $P_F$. In some examples, the cost function 214 is more complicated such that the maneuver 210 has multiple poses P of different importance at different times within the maneuver 210 that are incorporated into the problem 222 for the solver 230.

Based on these inputs, the solver 230 generates the solution 232. As part of the solution 232, the solver 230 determines contact forces 236 to perform the maneuver 210. In some examples, in addition to the contact forces 236, the solution 232 includes actual touchdown/liftoff timing and/or actual touchdown/liftoff locations. Here, the touchdown/liftoff timing and the touchdown/liftoff locations are referred to as actual, because the solver 230 may adjust the nominal liftoff/touchdown times and liftoff/touchdown locations based on optimization of the solver 230. In some instances, the solution 232 includes touchdown/liftoff timing, but only touchdown locations. By being able to adjust the nominal inputs, the robot 100 may be more robust since the robot 100 may adapt to feedback from the environment 30 (e.g., something bumps the robot 100) or disturbances in the behavior (e.g., stumbling or tripping). Additionally or alternatively, being able to adjust the timing and/or the location of a touchdown allows movement events 212 of a maneuver 210 to be more easily authored without concern for precise inputs as to timing or location (e.g., for the legs 120 of the robot 100). Stated differently, the user 10 only has to author a behavior (i.e., create a maneuver 210) that is approximately feasible and the solver 230 may determine a solution 232 that is actually feasible. Indirectly speaking, the solver 230 may also determine COM for the robot 100 and an orientation trajectory for the robot 100. Here, the solver 230 indirectly determines the COM and orientation trajectory because these values may be derived from the solution's contact forces 236 and forward dynamics. Forward dynamics generally refers to using forces (or torques) of a body to predict orientations for each part of the body. In other words, by knowing the structural relationships of the robot 100 and determining the contact forces 236 to perform the maneuver 210, forward dynamics can predict dynamics and/or kinematics for the robot 100 during the maneuver 210. Alternatively, solver 230 may model the robot body 110 as having a single part.

The solver 230 attempts to determine orientations for the robot 100 where the orientations are torque-based solutions 232 for the problem 222. By seeking a torque-based solution, the solver 230 focuses on torques for the robot 100 measured as a force multiplied by a position vector. Here, if the solver 230 was trying to determine one of these terms (e.g., either the force or the positon vector), the solver 230 would be able to utilize a quadratic program (QP) where the solution process would be linear. Unfortunately, since the solver 230 is attempting to optimize both an unknown force term and an unknown position vector term (i.e., a quadratic term), the solver 230 cannot rely on a traditional QP in its basic form. Instead, the solver 230 linearizes the problem.

In some implementations, the solver 230 is attempting to simultaneously determine a solution for a location of the body 110 relative to the foot 124 (i.e., the position vector term) and also the forces at the foot 124 (i.e., the force term). Here, since the solver 230 is trying to solve for both of these variables, the problem 222 is a nonlinear optimization problem (e.g., a quadratic problem) rather than linear optimization problem. Normally, this means that the solver 230 cannot optimize with a QP. Yet other, more general, optimization methods are not as effective as a QP because more general solvers (e.g., a sequential quadratic program) cost a significantly greater amount of time and therefore would not enable the robot 100 to meet speed requirements that allow the robot 100 to be reactive or even proactive in terms of balance or robot physics when performing a maneuver 210. To overcome this problem, the solver 230 linearizes the dynamics by making some assumptions to transform the problem 222 from a nonlinear optimization problem 222 (e.g., a quadratic problem) to a linear optimization problem 222. To explain the transformation, the solver 230 wants to determine a moment that is the product of two variables (i.e., force and a position vector) without actually being able to multiple the variables together. In some examples, the solver 230 represents the product of these two variables as a linear representation that is inaccurate. Yet the solver 230 represents this inaccuracy by the product of how wrong a guess or estimate is for each variable. Therefore, as the guesses for each variable improve, the inherent error (i.e., the inaccuracy of the linearization) shrinks.

In some implementations, the solver 230 is configured to determine contact forces 236 for each leg 120 in contact with the ground surface 12 at each time step 224. Here, a contact force 236 is a three-dimensional force (e.g., may include force components in the x, y, and/or z direction). For each time step 224, the solver 230 may assume that the contact forces 236 are a Piecewise Constant. In other words, the solver 230 may assume that the contact forces 236 do not change during a particular time step 224. In some configurations, the solver 230 defines a body state 238 of the robot 100 as the COM position of the robot 100, the COM velocity of the robot 100, orientation of the robot 100 (e.g., based on Euler angles or quaternions), and an angular velocity of the robot 100 in a world reference frame. As the solver 230 determines the contact forces 236, the solver 230 may use forward dynamics to determine what the body state 238 will be at each time step 224 of a maneuver 210.

In some examples, the body state 238 of the robot 100 defined by the solver 230 is a simple rigid body model for the robot 100. In other words, the solver 230 does not consider the robot 100 to be a legged robot 100 with articulable jointed legs 120 that couple to the body 110 of the robot 100. By modeling the robot 100 as a simple rigid body, the body state 238 determined by the solver 230 may have some inaccuracies. For example, since the robot 100 is more complicated than a simple rigid body, the dynamics of the robot 100 derived from the body state 238 of the robot 100 are likely to have some degree of inaccuracy while the kinematics of the robot 100 may be fairly accurate. In some examples, instead of defining the orientation of the robot 100 for the body state 238 in terms of a rigid body, the orientation of the robot 100 is defined in terms of a natural posture for the robot 100 where the natural posture accounts for additional inertial bodies of the robot 100 (e.g., the jointed legs 120, the arm 126, the members 128, etc.). Here, by using the natural posture, there is a tradeoff between an increased degree of accuracy for the dynamics for the robot 100 (e.g., motion of the legs 120), but a decreased degree of accuracy with respect to the kinematics of the robot 100 (e.g., accuracy as to where the hip joints $J_H$ are located on the robot 100). In some configurations, the solver 230 uses machine learning (e.g., a neural network) to blend the advantages of each approach. For instance, the solver 230 defines the orientation for the body state 238 of the robot 100 in terms of natural posture, but uses machine learning to determine offsets to the kinematics such that the dynamics of the robot 100 are still accurate and the accuracy of the kinematics for the robot 100 using natural posture increases.

In some examples, the solution 232 from the solver 230 includes adjustments to the timing of a touchdown and/or adjustments to a location of a touchdown. For instance, at the maneuver 210, a user 10 specifies whether a timing of a touchdown and/or a location of a touchdown are adjustable. When the user 10 specifies that the timing of a touchdown and/or a location of a touchdown may be adjusted, the solver 230 may determine these adjustments (e.g., if optimization indicates adjustments) as part of the solution 232.

Figure 2D:
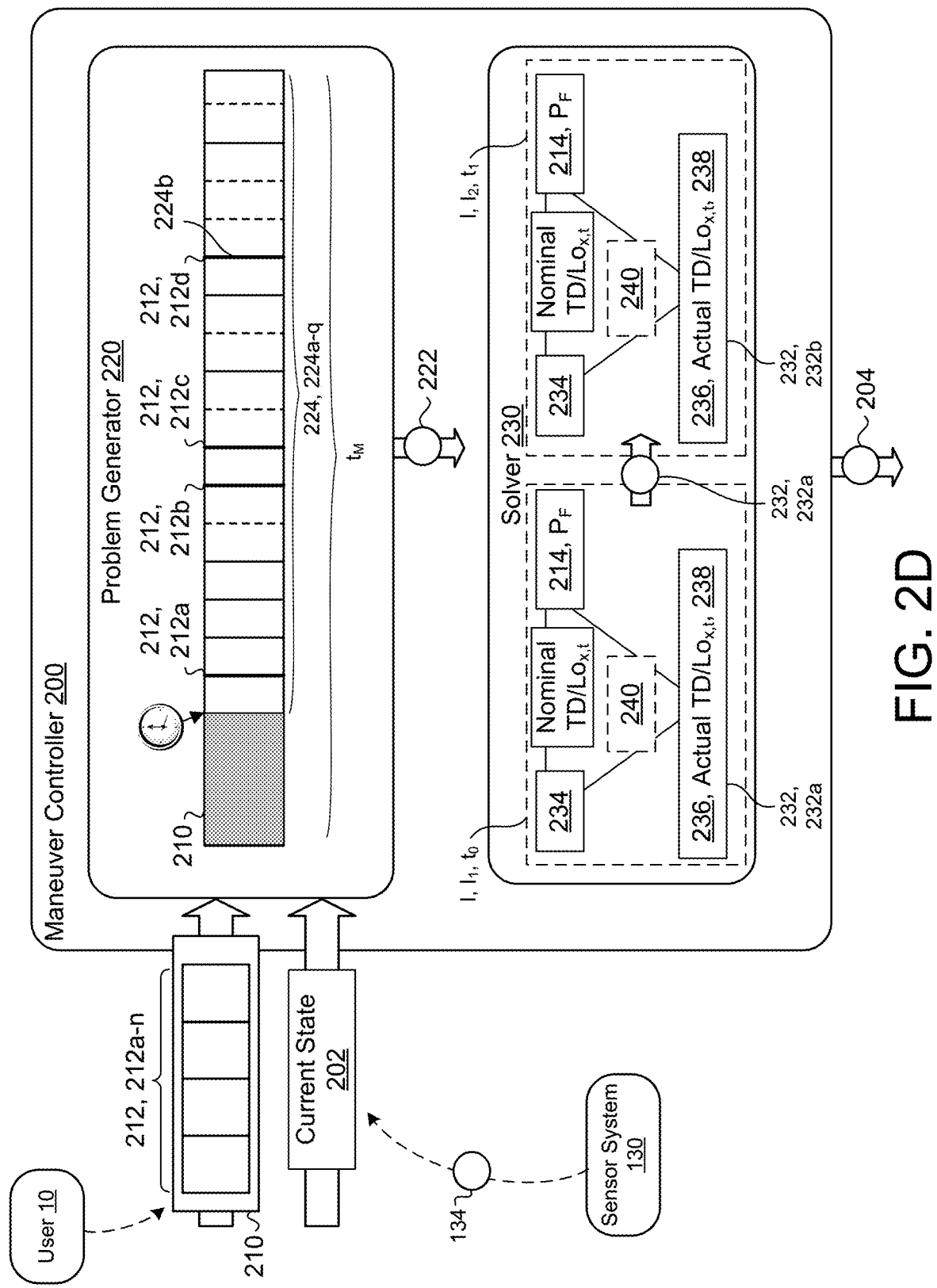

Referring to FIG. 2D, in some examples, the solver 230 iteratively generates one or more solutions 232. Here, as the solver 230 iteratively generates solutions 232, the problem 222 changes for each iteration I. This approach is in contrast to a more general solver, such as a sequential QP. When a sequential QP solves a QP, the sequential QP uses its solution to re-linearize and to solve the same QP. Although this is an iterative-based approach, the sequential QP does not allow the optimization problem to change between re-solves. In the case of the solver 230, when the solver 230 initially solves a QP at a first iteration I, $I_1$, the first solution 232, 232a does not correspond to an accurate solution 232 because of assumptions made to transform the problem 222 from a nonlinear optimization problem 222 (e.g., a quadratic problem) to a linear optimization problem 222. Due to the transformation from the nonlinear optimization problem 222 (e.g., a quadratic problem) to the linear optimization problem 222, however, the linearization error that makes the first solution 232a an inaccurate solution 232 is quadratic such that the error can be iteratively reduced to converge on an accurate solution 232. Therefore, in order to generate a more accurate solution 232 than the first solution 232a, the first solution 232a is fed back into solver 230 as a guess to linearize for the next iteration I, $I_2$ of the problem 222. Here, the problem changes 222 at each iteration I because the problem 222 accounts for the current state 202 of the robot 100 and the current state 202 updates for any passage of time. In other words, even when there may be a small amount of time between iterations I of the problem 222 (e.g., the problem 222 is attempted to be solved every tick t of a time clock for the robot 100), the problem 222 changes for the solver 230. By using the solution 232 of a prior iteration I as a linearization estimate for the current iteration I, the solver 230 shrinks the error over each iteration I to converge on an accurate solution 232. The quality of the solution 232 may be measured by comparing the solution 232 (e.g., at each iteration I) to an integrated solution 232i. The solver 230 generates the integrated solution 232i by running the solution 232 through forward dynamics for the robot 100. To illustrate, often the first solution 232a from the solver 230 is a poor solution because the linearization occurred around an initial point with minimal to no knowledge as to how accurate of a solution 232 that the initial point would provide for the solver 230. A second solution 232, 232b then becomes more accurate because the linearization occurs around the first solution 232a with a known accuracy. Often times, a second solution 232b has an accuracy that is usable for behavior control by the maneuver controller 200, but subsequent solutions, such as a third solution 232, 232c or a fourth solution 232, 232d, are generally even more accurate for behavior control by the maneuver controller 200.

In some implementations, the solver 230 linearizes the dynamics, which produces a problem with a quadratic cost function, which the solver 230 can formulate as a QP and solve with a QP solver. Had the solver 230 been unable to linearize the dynamics, the cost function would have been more complicated or higher order than quadratic. That cannot be formulated as a QP and can therefore not be solved by a QP solver. One example of a more general solver that can solve such problems is called sequential quadratic programming (SQP). The SQP does something akin to solving a QP and using the solution to re-linearize a new QP. So, in some instances, the solver 230 executes an SQP solver for the original non-linear problem while also allowing the non-linear problem to change between QP iterations. Moreover, the re-linearized solutions keep changing, rather than starting over once finished.

Optionally, the solver 230 may be configured to determine which solution iteration provides sufficient accuracy to control movement for a maneuver 210 by determining that a comparison between the integrated solution 232i and any respective solution 232 satisfies an optimization threshold. Here, the optimization threshold is a predetermined degree of accuracy that indicates that the solution 232 will have a likelihood of success to perform the maneuver 210. In some examples, the comparison is a different comparison. In other examples, the comparison is a ratio comparison (e.g., much like a percent yield).

In some implementations, the QP of the solver 230 is a cost function and some number of linear constraints. The solver 230 attempts to satisfy these cost constraints in order to achieve optimization for the problem 222. These cost constraints may be user specified at the maneuver 210, universal to the solver 230, and/or other settings controllable by an entity (e.g., the user 10). In some examples, the solver 230 includes a cost term 240 to minimize contact forces 236. Another example of a cost term 240 is that the solver 230 attempts to achieve a target pose $P_T$ where the target pose $P_T$ has an associated value (e.g., assigned cost of importance). The target pose $P_T$ may occur solely at the end of the movement trajectory of the maneuver 210 (i.e., as the final pose $P_F$) or a target pose $P_T$ may occur at other times within the maneuver 210 (e.g., at each time step 224 or one or more designated time steps 224). Other potential cost terms 240 for the solver 230 include a maximum and/or a minimum deviation from nominal touchdown timing and/or nominal touchdown locations. Here, these cost terms 240 may dictate how important the location and the timing for touchdowns are to the user 10. Additionally or alternatively, the user 10 may include a cost term 240 that specifies the hip position with respect to the foot 124. The problem 222 may also be configured such that the user 10 may include custom cost terms 240 (e.g., custom movements). For example, the user 10 dictates a cost term 240 indicating that the robot 100 should jump as high as possible or lean as far as possible to a particular direction. In some configurations, the solver 230 includes a cost term 240 to minimize joint torques (or maximize joint torques) for the joints J used for a maneuver 210. Although these cost terms 240 are each described separately, the solver 230 may be subject to one or more of these cost terms 240 (e.g., in any combination).

Constraints can be either inequality or equality constraints. In some examples, the solver 230 includes friction constraints 240f (e.g., as inequalities). Since the contact forces 236 are optimization variables for the solver 230, the friction constraints 240f may be directly written to depend on these optimization variables. Here, the configuration of the friction constraints 240f generally resembles a function with a conical shape or a pyramid shape (e.g., a four-sided three-dimensional pyramid). To implement the friction constraints 240f as a cone, the solver 230 may use iterative constraints (e.g., the leg length constraints). In some of these examples, the function of the friction constraints 240f accommodates for controllers 172 that have slight inaccuracies (e.g., at small force values) by having a minima of the function be a positive non-zero number.

In some implementations, the solver 230 uses iterative constraints 240, 240i. Iterative constraints 240i refer to constraints 240 that capitalize on a feature of the solver 230 where the solver 230 may add additional constraints 240 and continue solving or perform a quick solution 232 without restarting the problem 222. Iterative constraints 240i may be useful when a constraint 240 would generally be best expressed as a non-linear function, but this type of constraint 240 is incompatible with the QP of the solver 230. Instead of trying to represent a non-linear function as an approximation of several individual linear constraints 240, the solver 230 first generates a solution 232 without the iterative constraints 240i. This solution 232 is then inspected to determine whether the solution 232 would violate a target non-linear constraint 240. When the solver 230 identifies that the solution 232 would violate a target non-linear constraint 240, the solver 230 may generate an iterative constraint 240i. Here, the iterative constraint 240i further constrains the solution 232 as a linear constraint that is compatible with the solver 230 as the solver 230 solves the problem 222. By solving the problem without the non-linear constraint first, the solver 230 may better determine what linear approximation of the non-linear constraint will be most accurate.

Figure 2E:
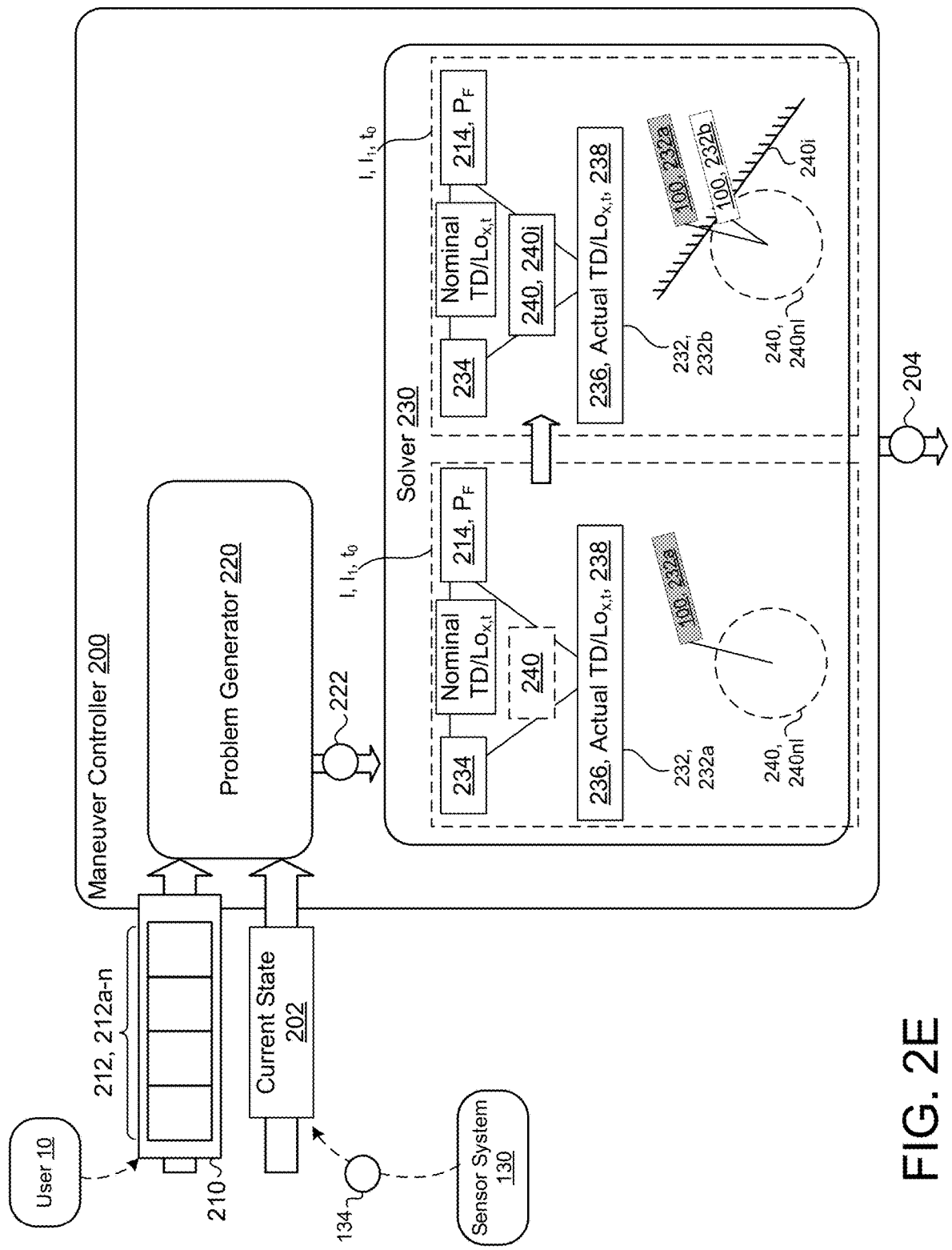
Figure 2F:
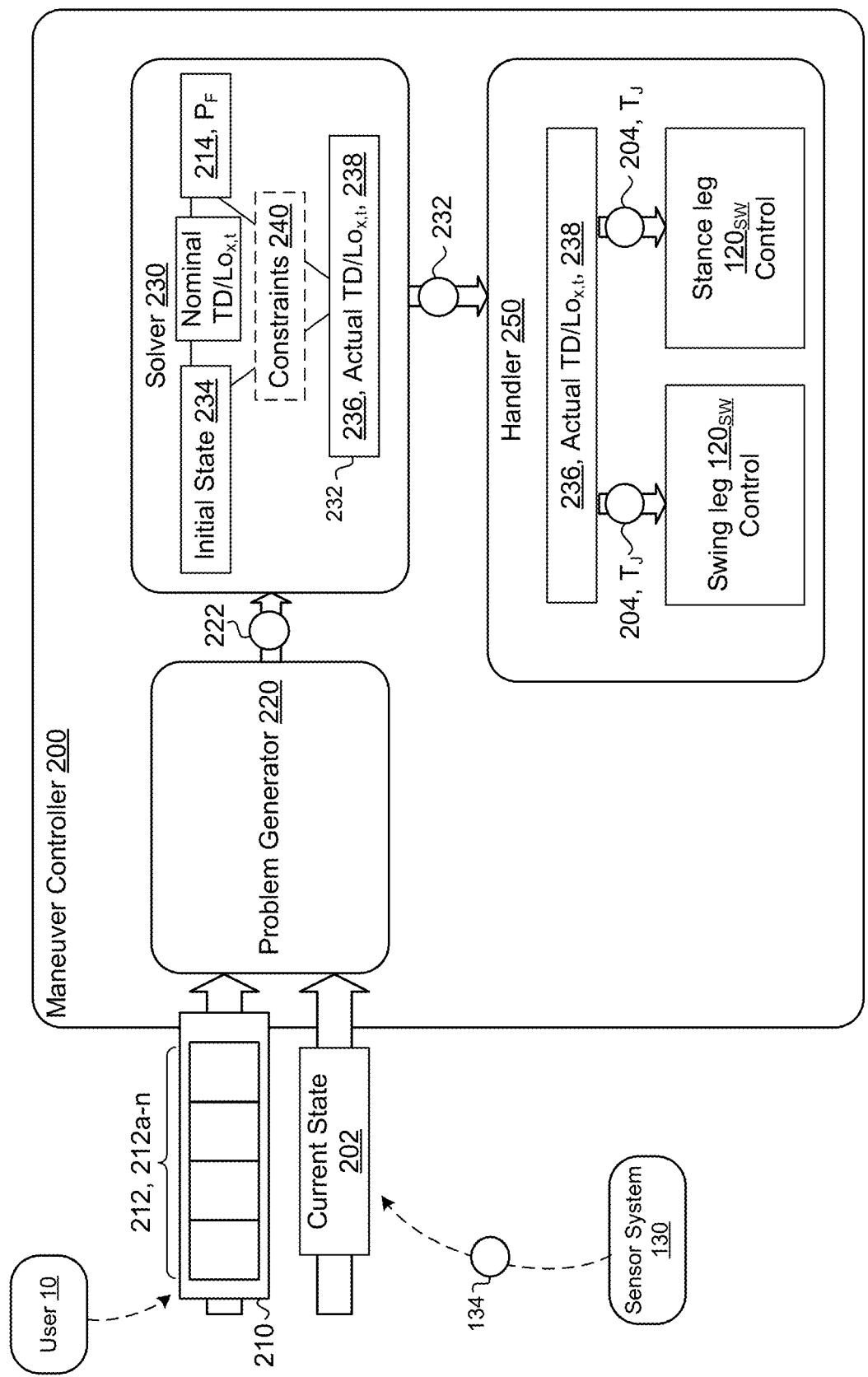

For example, FIG. 2E illustrates a dotted circle that represents a leg length constraint 240 where a length of a leg 120 of the robot 100 may be constrained as a function of the position of a hip (e.g., hip joint JO of the robot 100. In other words, as long as a position of the hip joint $J_H$ is within the dotted circle, the robot 100 would satisfy the leg length constraint 240. Unfortunately, the dotted circle would be a non-linear constraint 240, 240n1. Here, the solver 230 generates a first solution 232, 232a for the robot 100 (e.g., shown as a first box) and identifies that this first solution 232a would violate the non-linear constraint 240n1 of the dotted circle that represents a position of the hip of the robot 100. Due to this violation, the solver 230 generates an iterative constraint 240i that is shown as a line tangent to a point on the circle near the first solution 232a. With the iterative constraint 240i, the solver 230 generates a second solution 232, 232b (e.g., shown as a second box) with some portion of the second solution 232, 232b within the non-linear constraint 240n1 of the dotted circle. Here, the first solution 232a and the second solution 232b, occur during the same QP iteration $I_1$, to such that the solver 230 does not re-linearize the problem 222 (i.e., the solution 232a-b occur at the same tick to). The iterative constraint 240i functions as an add-on constraint 240 during a linearization iteration I. In other words an iteration constraint 240i occurs in an iteration within a given problem 222 while a linearization iteration occurs when the solver 230 solves the problem 222 at a new or subsequent future time (e.g., subsequent tick $t_1$). The solver 230 may include constraints 240 as to a maximum leg length or a minimum leg length.

Another example of a constraint 240 for the solver 230 is a hip constraint 240, 240h. Here, a hip constraint 240h represents that an upper member $128_U$ of each leg 120 has a limited range of motion to rotate at the hip joint $J_H$ about the y-direction axis $A_Y$ in the X-Z frontal plane (also referred to as a body plane). Over rotation of the upper member $128_U$ would cause an impact or interference with the body 110 of the robot 100. In some implementations, the hip constraint 240h is represented as a line in the X-Z frontal plane that constrains the foot position for a foot 124 of the robot 100 that corresponds to the leg 120 with the upper member $128_U$. By constraining a X-Z position of the foot position, the upper member $128_U$ should not cause over rotating issues.

In some examples, there are constraints 240 on the timing and/or the position of liftoff/touchdown. Although the user 10 may specify that the solver 230 is able to adjust the timing of a touchdown/liftoff and/or a location of a touchdown/liftoff, these adjustments may include constraints 240 that identify a range or extent for these adjustments. For instance, a constraint 240 for the touchdown location is represented as a polygonal region where the polygonal region represents a legal touchdown area.

With the solution 232, the maneuver controller 200 is configured to perform the behavior (e.g., an optimized version of the behavior) corresponding to the maneuver 210 of the problem 222. In other words, the maneuver controller 200 has to actually translate the solution 232 into one or more commands 204 to perform the maneuver 200. For instance, the maneuver controller 200 generates a command 204 that controls one or more joints J corresponding to the maneuver 210 to perform the maneuver 210 (e.g., referred to as a joint command 204). Here, the command 204 may assign joint torques $T_J$ to the joints J based on the solution 232 from the solver 230. Additionally or alternatively, the command 204 may assign desired positions/velocities to joints J. In general, stance legs are torque-controlled, but swing legs are position-controlled.

Figure 2G:
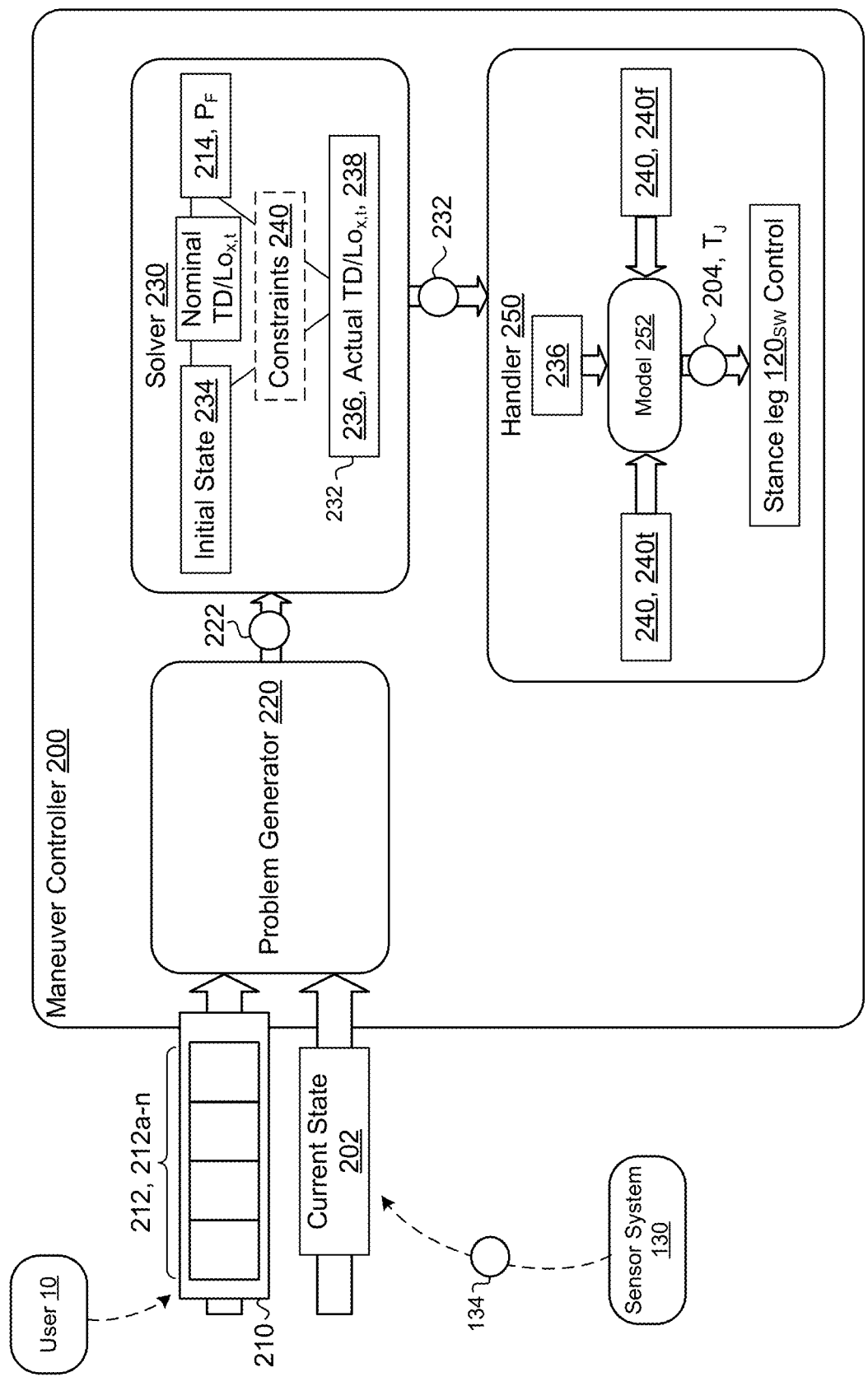

In some implementations, for a legged robot 100, the maneuver controller 200 performs the behavior by handling stance legs $120_{ST}$ and/or swing legs $120_{SW}$. To perform handling of the legs 120, the maneuver controller 200 may have different protocols to apply the solution 232 to the stance leg $120_{ST}$ and/or the swing leg $120_{SW}$. In some configurations, such as FIGS. 2F-2G, to translate the solution 232 from the solver 230 to actual movement control, the maneuver controller 200 also includes a handler 250. In some examples, the handler 250 is generally configured to identify the contact force(s) 236, the touchdown location(s), and/or the touchdown timing from the solution 232 and implement these parts of the solution 232 to control the stance legs $120_{ST}$ and/or swing legs $120_{SW}$. In these configurations, the handler 250 receives the following as inputs: the contact forces 236 from the solution 232 as target forces for the stance leg $120_{ST}$; torque limit constraints 240, 240t for joints J of the stance leg $120_{ST}$; and the friction constraints 240f. Based on these inputs, the handler 250 determines joint torques $T_J$ to apply at joints J of the stance leg $120_{ST}$. In some configurations, in order for the handler 250 to control one or more stance legs $120_{ST}$ of the robot 100 based on the solution 232, the handler 250 may include an optimization model 252, such as a QP, that receives the inputs and determines the joint torques $T_J$ to apply at joints J of the stance leg $120_{ST}$ (e.g., as shown in FIG. 2G). By using the handler 250, the maneuver controller 200 may ensure that constraints 240 that may have been violated or partially violated at the solver 230 (e.g., by tradeoffs at the solver 230) are actually accounted for when controlling one or more stance legs $120_{ST}$. Otherwise, actual control may be problematic for achieving the maneuver 210 and/or maintaining balance during the maneuver 210. To illustrate, the solver 230 may determine a contact force 236 that obeys the friction constraints 240, but does not obey the torque limit constraints 240t. In this example, if the handler 250 considered the torque limit constraints 240t, but not the friction constraints 240f, the handler 250 may modify the joint torque $T_J$ to comply with the torque limit constraints 240t and violate the friction constraints 240f during actual control of the stance leg $120_{ST}$. To overcome these issues, the handler 250 is configured to duplicate constraints 240 to ensure optimal actual control for the robot 100. The handler 250 may include an individual optimization model for each leg 120 of the robot 100 or may include a larger optimization model for multiple legs 120 that is capable of allocating joint control between more than one leg 120 (e.g., to compensate for deficiencies between legs 120).

The swing legs $120_{SW}$ may be controlled by the maneuver controller 210 (e.g., by the handler 250) in a variety of ways based on the solution 232 from the solver 230 (e.g., based on the touchdown position and/or the touchdown timing of the solution 232). In some examples, the maneuver controller 210 controls the swing legs $120_{SW}$ according to the specification of the maneuver 210. For instance, the user 10 specifies waypoints in the maneuver 210 where a swing leg 120 targets for a touchdown. Here, the waypoints specified by the maneuver 210 may be specified according to time or according to position. In the case where the user 10 specifies the waypoint in terms of position, the maneuver controller 200 may determine timing corresponding to that position. In some special circumstances, the maneuver controller 200 is configured to use the solution 232 to command swing leg movement such that the swing leg $120_{SW}$ touches down on vertical surface (i.e., a surface with significantly non-vertical normal) rather than a relatively horizontal surface (e.g., the ground surface 12). In some configurations, the maneuver controller 200 employs the swing leg control techniques, as described in U.S. Application No. 62/883,502, filed Aug. 6, 2019, titled "Leg Swing Trajectories," which is hereby incorporated by reference, to control one or more swing legs $120_{SW}$ of the robot 100 based on the solution 232 from the solver 230.

In some implementations, the solver 230 can take a variable amount of time to complete. Moreover, the solver may take especially long if there are many active constraints 240, which generally means that it is doing something difficult. The maneuver controller 200 may handle that by canceling execution of the solver 230 for the solution 232 and using an only partially optimized solution 232 having a shorter execution time. Moreover, since the solver 230 may rely on linearizing around a previous solution, the solver 230 may can take several iterations to converge during which time bad solutions 232 may occur. The solver 230 knows, however, when this is happening by using the measure of how well the linearization is doing. In response, the control system 170 may specify a backup controller 172, 200 that may not be quite optimal, but is acceptable for the few timesteps (e.g., typically <10 ms) required for the desired controller 172, 200 to converge. The control system 170 may continue doing whatever it was doing previously by specifying that controller 172 as the backup controller 172.

Figure 3:
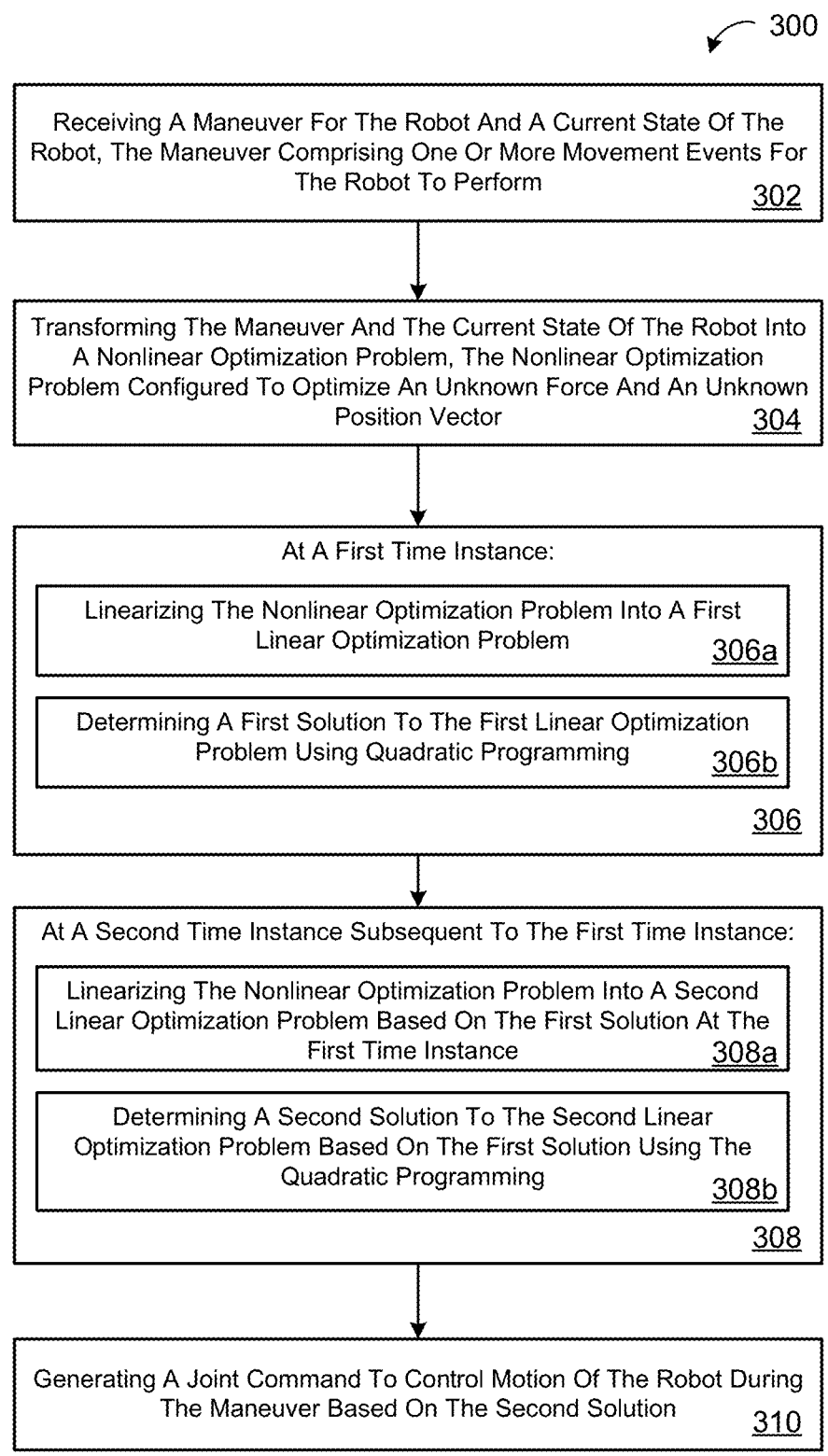
FIG. 3 is an example arrange of operations for a robot to perform a maneuver using a maneuver controller.

FIG. 3 is an example arrangement of operations for a method 300 of dynamically planning at least one maneuver 210. At operation 302, the method 300 receives a maneuver 210 for the robot 100 and a current state 202 of the robot 100 where the maneuver 210 includes one or more movement events 212 for the robot 100 to perform. At operation 304, the method 300 transforms the maneuver 210 and the current state 202 of the robot 100 into a nonlinear optimization problem 222 where the nonlinear optimization problem 222 is configured to optimize an unknown force and an unknown position vector. At operation 306, the method 300 performs two sub-operations 306, 306a-b at a first time instance $I_1$, $t_0$. At sub-operation 306a, the method 300 linearizes the nonlinear optimization problem 222 into a first linear optimization problem 222, 222a. At sub-operations 306b, the method 300 determines a first solution 232, 232a to the first linear optimization problem 222a using quadratic programming. At operation 308, the method 300 performs two sub-operations 308, 308a-b at a second time instance $I_1$, to where the second time instance $I_2$, $t_1$ is subsequent to the first time instance $I_1$, $t_0$. At sub-operation 308a, the method 300 linearizes the nonlinear optimization problem 222 into a second linear optimization problem 222, 222b based on the first solution 232a at the first time instance $t_0$. At sub-operation 308b, the method 300 determines a second solution 232, 232b to the second linear optimization problem 222b based on the first solution 232a using the quadratic programming. At operation 310, the method 300 generates a joint command 204 to control motion of the robot 100 during the maneuver 210 based on the second solution 232b.

In some examples, the method 300 also determines an integrated solution 232i based on the second solution 232b and forward dynamics for the robot 100 and determines that a comparison between the integrated solution 232i and the second solution 232b satisfies an optimization threshold where the optimization threshold indicates a degree of accuracy for a respective solution 232 to generate a joint command 204. In some implementations, the method 300 further determines that the second solution 232b fails to satisfy a nonlinear constraint 240, 240n1 and generates an iterative constraint 240, 240i for the second linear optimization problem 222b where the iterative constraint 240i includes a linear constraint based on the failure of the second solution 232b to satisfy the nonlinear constraint 240n1. Here, the method 300 also updates the second solution 232b to the second linear optimization problem 222b using the quadratic programming where the quadratic programming includes the iterative constraint 240i.

Figure 4:
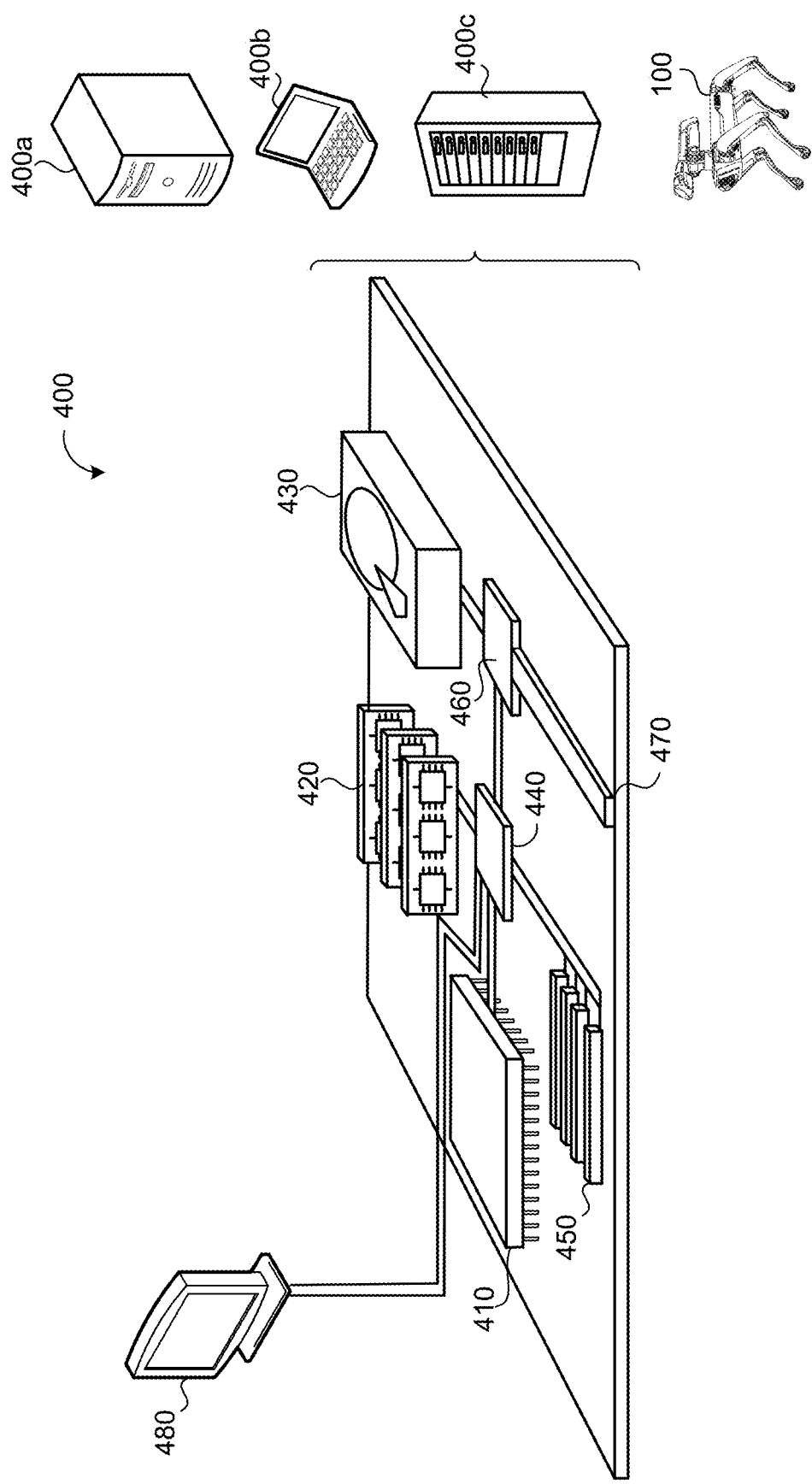
FIG. 4 is a schematic view of an example computing device that may be used to implement the systems and the methods described herein.

FIG. 4 is schematic view of an example computing device 400 that may be used to implement the systems (e.g., the maneuver controller 200) and methods (e.g., the method 300) described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (e.g., data processing hardware), memory 420 (e.g., memory hardware), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, as part of a rack server system 400c, or as part of a robot 100.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware, a maneuver for a legged robot and a current state of the legged robot, the maneuver comprising one or more movement events for the legged robot to perform;
transforming, by the data processing hardware, the maneuver and the current state of the legged robot into a nonlinear optimization problem, the nonlinear optimization problem configured to optimize an unknown force and an unknown position vector;

at a first time instance:
- linearizing, by the data processing hardware, the nonlinear optimization problem into a first linear optimization problem; and
- determining, by the data processing hardware, a first solution to the first linear optimization problem using quadratic programming;

at a second time instance subsequent to the first time instance:
- linearizing, by the data processing hardware, the nonlinear optimization problem into a second linear optimization problem based on the first solution at the first time instance; and
- determining, by the data processing hardware, a second solution to the second linear optimization problem based on the first solution using the quadratic programming; and generating, by the data process hardware, a joint command to control motion of the legged robot during the maneuver based on the second solution.

2. The method of claim 1, further comprising:
- determining, by the data processing hardware, an integrated solution based on the second solution and forward dynamics for the legged robot; and
- determining, by the data processing hardware, that a comparison between the integrated solution and the second solution satisfies an optimization threshold, the optimization threshold indicating a degree of accuracy for a respective solution to generate a joint command.

3. The method of claim 1, further comprising, at the second time instance:
- determining, by the data processing hardware, that the second solution fails to satisfy a nonlinear constraint;
- generating, by the data processing hardware, an iterative constraint for the second linear optimization problem, the iterative constraint comprising a linear constraint based on failure of the second solution to satisfy the nonlinear constraint; and
- updating, by the data processing hardware, the second solution to the second linear optimization problem using the quadratic programming, the quadratic programming comprising the iterative constraint.

4. The method of claim 1, wherein the unknown force corresponds to a force at a foot of the legged robot when the legged robot performs the maneuver.

5. The method of claim 1, wherein the unknown position vector corresponds to a location of a body of the legged robot relative to a foot of the legged robot when the legged robot performs the maneuver.

6. The method of claim 1, wherein each of the first solution and the second solution comprise contact forces for one or more legs of the legged robot against a surface, touchdown positions for the one or more legs of the legged robot, touchdown times for the one or more legs of the legged robot, or liftoff times for the one or more legs of the legged robot.

7. The method of claim 1, further comprising instructing, by the data processing hardware, joints of at least one stance leg of the legged robot based on the joint command, the joint command comprising joint torques for the joints of the at least one stance leg.

8. The method of claim 7, further comprising generating, by the data processing hardware, the joint torques for the joints of the at least one stance leg by determining that contact forces of the second solution that correspond to the at least one stance leg satisfy torque limit constraints for at least one stance leg and friction constraints for the at least one stance leg.

9. The method of claim 1, wherein the legged robot corresponds to a quadruped robot.

10. The method of claim 1, wherein receiving the maneuver comprises receiving the maneuver from a user device in communication with the data processing hardware, and wherein the maneuver is defined by a user of the user device at a user interface executing on the user device.

11. A robot comprising:
- a body;
- two or more legs coupled to the body; and
- a control system in communication with the body and the two or more legs, the control system comprising data processing hardware and memory hardware in communication with the data processing hardware, the memory hardware storing instructions that when executed on the data processing hardware cause the data processing hardware to perform operations comprising:
  - receiving a maneuver for the robot and a current state of the robot, the maneuver comprising one or more movement events for the robot to perform;
  - transforming the maneuver and the current state of the robot into a nonlinear optimization problem, the nonlinear optimization problem configured to optimize an unknown force and an unknown position vector;
  - at a first time instance:
    - linearizing the nonlinear optimization problem into a first linear optimization problem; and
    - determining a first solution to the first linear optimization problem using quadratic programming;
  - at a second time instance subsequent to the first time instance:
    - linearizing the nonlinear optimization problem into a second linear optimization problem based on the first solution at the first time instance; and
    - determining a second solution to the second linear optimization problem based on the first solution using the quadratic programming; and
  - generating a joint command to control motion of the robot during the maneuver based on the second solution.

12. The robot of claim 11, wherein the operations further comprise:
- determining an integrated solution based on the second solution and forward dynamics for the robot; and
- determining that a comparison between the integrated solution and the second solution satisfies an optimization threshold, the optimization threshold indicating a degree of accuracy for a respective solution to generate a joint command.

13. The robot of claim 11, wherein the operations further comprise, at the second time instance:
- determining that the second solution fails to satisfy a nonlinear constraint;
- generating an iterative constraint for the second linear optimization problem, the iterative constraint comprising a linear constraint based on failure of the second solution to satisfy the nonlinear constraint; and
- updating the second solution to the second linear optimization problem using the quadratic programming, the quadratic programming comprising the iterative constraint.

14. The robot of claim 11, wherein the unknown force corresponds to a force at a foot of the robot when the robot performs the maneuver.

15. The robot of claim 11, wherein the unknown position vector corresponds to a location of the body of the robot relative to a foot of the robot when the robot performs the maneuver.

16. The robot of claim 11, wherein each of the first solution and the second solution comprise contact forces for one or more legs of the robot against a surface, touchdown positions for the one or more legs of the robot, touchdown times for the one or more legs of the robot, or liftoff times for the one or more legs of the robot.

17. The robot of claim 11, wherein the operations further comprise instructing joints of at least one stance leg of the two or more legs of the robot based on the joint command, the joint command comprising joint torques for the joints of the at least one stance leg.

18. The robot of claim 17, wherein the operations further comprise generating the joint torques for the joints of the at least one stance leg by determining that contact forces of the second solution that correspond to the at least one stance leg satisfy torque limit constraints for at least one stance leg and friction constraints for the at least one stance leg.

19. The robot of claim 11, wherein the robot corresponds to a quadruped robot.

20. The robot of claim 11, wherein receiving the maneuver comprises receiving the maneuver from a user device in communication with the data processing hardware, and wherein the maneuver is defined by a user of the user device at a user interface executing on the user device.

* * * * *